US011153469B2

(12) United States Patent
Overmann

(10) Patent No.: US 11,153,469 B2
(45) Date of Patent: Oct. 19, 2021

(54) MODULAR OPTICAL RECORDING SYSTEM

(71) Applicant: Christian Overmann, Oldenburg (DE)

(72) Inventor: Christian Overmann, Oldenburg (DE)

(73) Assignee: Dream Chip Technologies GmbH, Garbsen (DE)

( * ) Notice: Subject to any disclaimer, the term of this patent is extended or adjusted under 35 U.S.C. 154(b) by 30 days.

(21) Appl. No.: 16/480,012

(22) PCT Filed: Jan. 29, 2018

(86) PCT No.: PCT/EP2018/052174
§ 371 (c)(1),
(2) Date: Jul. 23, 2019

(87) PCT Pub. No.: WO2018/138364
PCT Pub. Date: Aug. 2, 2018

(65) Prior Publication Data
US 2019/0373143 A1 Dec. 5, 2019

(30) Foreign Application Priority Data
Jan. 27, 2017 (DE) ...................... 10 2017 000 889.2

(51) Int. Cl.
*H04N 5/225* (2006.01)
*H04N 5/222* (2006.01)

(52) U.S. Cl.
CPC ......... *H04N 5/2252* (2013.01); *H04N 5/2253* (2013.01); *H04N 5/2254* (2013.01); *H04N 5/2256* (2013.01); *H04N 5/2228* (2013.01); *H04N 5/2257* (2013.01)

(58) Field of Classification Search
CPC .. H04N 5/2228; H04N 5/2252; H04N 5/2253; H04N 5/2254; H04N 5/2256; H04N 5/2257; H04N 5/23203; H04N 5/23287
See application file for complete search history.

(56) References Cited

U.S. PATENT DOCUMENTS

| | | | |
|---|---|---|---|
| 4,615,590 A | 10/1986 | Alvarez et al. | |
| 5,005,948 A | 4/1991 | Takahashi et al. | |
| 5,825,545 A | 10/1998 | Kino et al. | |
| 6,375,369 B1 | 4/2002 | Schneider et al. | |
| 9,306,475 B1 * | 4/2016 | Ba-Tis ................... | H02N 1/008 |
| 2002/0080242 A1 | 6/2002 | Takahashi et al. | |
| 2003/0067544 A1 | 4/2003 | Wada | |

(Continued)

FOREIGN PATENT DOCUMENTS

| | | |
|---|---|---|
| DE | 19942900 | 5/2000 |
| DE | 102004045430 | 5/2006 |

(Continued)

*Primary Examiner* — Amy R Hsu
(74) *Attorney, Agent, or Firm* — Gudrun E. Huckett

(57) ABSTRACT

The invention relates to a modular optical recording system. According to the invention, a compact, flexibly configurable and expandable system structure for image recording, image stabilization and image correction is provided with an optical observation device that is to be arranged in the region of a preferably cylindrical housing concept. The recording system is designed in such a manner that a precise, play-free and frictionless mechanical correction of at least complete rotations about the optical axis and/or a precise and play-free adjustment of the flange focal distance is made possible.

22 Claims, 23 Drawing Sheets

(56) References Cited

U.S. PATENT DOCUMENTS

| | | | |
|---|---|---|---|
| 2003/0076421 A1 | 4/2003 | Dutta | |
| 2003/0077082 A1 | 4/2003 | Ito | |
| 2005/0001906 A1 | 1/2005 | Sato et al. | |
| 2005/0270379 A1 | 12/2005 | Seo | |
| 2005/0276589 A1 | 12/2005 | Seo | |
| 2006/0064884 A1 | 3/2006 | Seo | |
| 2006/0067660 A1 | 3/2006 | Seo | |
| 2006/0098967 A1 | 5/2006 | Togawa | |
| 2006/0104633 A1 | 5/2006 | Kenoyer et al. | |
| 2006/0284495 A1* | 12/2006 | Seo | H02K 11/215 310/12.06 |
| 2009/0245774 A1* | 10/2009 | Uenaka | H04N 5/23287 396/55 |
| 2009/0251551 A1 | 10/2009 | Uenaka | |
| 2009/0303379 A1 | 12/2009 | Wada et al. | |
| 2010/0157074 A1 | 6/2010 | Kawai et al. | |
| 2010/0215353 A1 | 8/2010 | Hashi et al. | |
| 2010/0309323 A1 | 12/2010 | Shin et al. | |
| 2011/0050921 A1 | 3/2011 | Noto | |
| 2012/0218428 A1 | 8/2012 | Suzuka | |
| 2012/0249810 A1 | 10/2012 | Sato et al. | |
| 2012/0249814 A1* | 10/2012 | Miyoshi | H04N 5/2328 348/208.7 |
| 2014/0347506 A1 | 11/2014 | Wakamatsu | |
| 2015/0036047 A1* | 2/2015 | Bledsoe | H04N 5/2252 348/375 |
| 2016/0028844 A1 | 1/2016 | Anderson et al. | |
| 2017/0078583 A1* | 3/2017 | Haggerty | H04N 5/23296 |
| 2017/0155846 A1* | 6/2017 | Ezawa | H04N 5/2252 |
| 2017/0171440 A1* | 6/2017 | Park | G02B 27/646 |
| 2017/0180619 A1* | 6/2017 | Ba-Tis | H04N 5/22521 |

FOREIGN PATENT DOCUMENTS

| | | |
|---|---|---|
| DE | 10 2013 004 849 | 9/2014 |
| EP | 0 980 181 | 2/2000 |
| EP | 2 485 474 | 8/2012 |
| JP | S6399680 | 4/1988 |
| JP | H01258565 | 10/1989 |
| JP | 3222174/H05203864 | 8/1993 |
| JP | H0630327 | 2/1994 |
| JP | H09261524 | 10/1997 |
| JP | 2004226956 | 8/2004 |
| JP | 2004295027 | 10/2004 |
| JP | 2006337680 | 12/2006 |
| JP | 2007096493 | 4/2007 |
| JP | 2007110449 | 4/2007 |
| JP | 2007241254 | 9/2007 |
| JP | 2008065163 | 3/2008 |
| JP | 2008115836 | 5/2008 |
| JP | 2009003010 | 1/2009 |
| JP | 2010114874 | 5/2010 |
| JP | 2010128386 | 6/2010 |
| JP | 2011004139 | 1/2011 |
| JP | 2012103373 | 5/2012 |
| JP | 2012103376 | 5/2012 |
| JP | 2013009107 | 1/2013 |
| WO | 2009/060624 | 5/2009 |
| WO | 2010/044197 | 4/2010 |
| WO | 2012/153281 | 11/2012 |

* cited by examiner

MODULAR OPTICAL RECORDING SYSTEM

The invention concerns a system structure for image recording, image stabilization, and image correction, comprising an optical observation device that is to be arranged within a housing concept.

BACKGROUND OF THE INVENTION

Since the market introduction of action cams and as a result of a quickly advancing development of digital image sensors, the desire for high quality recordings of moving images from always new viewing angles in very restricted space conditions and for fast movement sequences leads to a significant miniaturization need of the camera systems and of the stabilizing mechanical systems.

Moreover, the constantly growing international interconnectedness and communication through social media and the Internet has the result that the recorded images and videos are increasingly further used unprocessed so that the demand in regard to processing of image data during recording is increasing greatly. Since slightly blurred images strongly negatively affect the quality perception, most camera systems internally stabilize the recorded image data fully electronically already within the context of this processing. However, this has the disadvantage that a portion of the maximally possible resolution cannot be used for the output. For space reasons and cost reasons, an internal compression of the image data takes place in addition prior to them being either output or stored.

This is contrasted by mechanical correction systems which are capable of completely utilizing the available surface of the image sensor but, on the one hand, compensate only shaking resulting from a hand movement or, on the other hand, can only stabilize slanted positions and, in addition, the whole system comprised of recording device and lens can neither be minimized to a satisfactory degree nor enable a stabilization in real time. In relation to the afore described new requirements, in particular resulting from an operation in outdoor environments, these concepts must however be considered unsuitable because similarly neither complete rotations nor greatly slanted positions and shaking can be stabilized by one system. Moreover, in particular the systems for compensation of slanted positions of the entire camera system (so-called steady cam systems) are generally embodied very large and moreover are protected only unsatisfactorily from external influences.

PRIOR ART

In the following, a short overview of the current prior art will be provided and the disadvantages of technical solutions and patents and publications filed in this regard will be explained in relation to the invention disclosed subsequently.

In summary, it can be said that current systems for stabilization and correction of recorded photo and video data in general can be divided into two groups.

In this context, there are systems which correct shaking and undesired rotation with a digital method. For this purpose, the respective slanted position and shaking of the housing or of the imaging unit are recorded by means of electronic sensors such as gyros, acceleration sensors and magnet sensors or the like. The thus obtained sensor data are then processed by means of a central computing unit and a stabilizing correction that counteracts shaking and slanted position is determined. This correction is then applied digitally to the recorded image data and video data, i.e., the material is internally rotated, moved, and output without performing a mechanical correction. A great disadvantage of this method is an often very strong cropping of the recorded image data which leads to the output format size in relation to the utilizable sensor surface being greatly reduced. For this reason, this method is suitable only for very minimal corrections such as vibrations and minimal shaking resulting from manual operation of the camera. In relation to the invention herewith submitted, these systems with a digital correction are however listed only to be complete because the function is decisively based on a sensor-supported mechanical correction method which will be discussed in the following in more detail.

Undesirable rotations and shaking can additionally be corrected in that, by means of an electromechanical system, it is provided that the lateral edges of the imaging unit are respectively parallel, in theoretical ideal situation congruent, to the corresponding edges of the projected or recorded image and therefore are completely illuminated.

In the context of the search in regard to prior art, the following publications have been analyzed as being relevant:

1. US20050001906A1, 2. US20060098967A1, 3. US20140347506A1, 4. US20060098967A1, 5. WO2009060624, 6. U.S. Pat. No. 4,615,590A, 7. US20120218428A1, 8. U.S. Pat. No. 5,825,545A, 9. JP2004295027A, 10. JP2004226956A, 11. US20100215353A1, 12. WO2012153281 A1, 13. JPS6399680A, 14. JP2013009107A, 15. JPH09261524A, 16. JPH0630327A, 17. US20090245774A1, 18. JP2010128386A, 19. JP2008065163A, 20. JP2007241254A, 21. US20020080242A1, 22. DE102004045430A1, 23. US20060284495A1, 24. US20090251551 A1, 25. DE19942900A1, 26. US20150036047A1, 27. JP2006337680A, 28. US20050276589A1, 29. US2012024981 A1, 30. US2003067544A1, 31. US20120249814A1, 32. US2011050921 A1, 33. US2006067660A1, 34. US20060064884A1, 35. US20050270379A1, 36. JP2008116836A, 37. US2010309323A1, 38. US220100157074A1, 39. US2003076421 A1, 40. JP2007096493A, 41. JP2007110449A, 42. JP2009003010A, 43. US20030077082A1, 44. US20060104633A1, 45. DE102013004849A1, 46. US20160028844A1, 47. JP57099874A, 48. JP2012103376A, 49. JP2012103373A, 50. WO2010044197A1, 51. JP2008116836A, 52. JP2010114874A

As disclosed in the publications 1-10, an electromechanical correction of rotations and shaking can be achieved in that, by moved lens (groups), prisms or mirrors, a change of the beam path is caused and, in this way, the slanted position or shaking is compensated. In some cases, the image recording unit itself is (additionally) also moved (compare publications Nos. 9, 11-36, 46, 48, and 51).

Most cameras with these correction systems employ coils in combination with permanent magnets or piezo actors for movement of the optical elements or of the image sensors, as described in an exemplary fashion in publications Nos. 16-19, 22, 27-30, 32, 37, 46, 48-50, and 52. The use of such actors enables in particular a precise translatory orientation of elements in a plane, even though only to a very limited extent. Moreover, the combination of purely axial translations, with an exact control and synchronization and play-free support as a prerequisite, can perform precise planar rotations. Since the geometric specification and placement of the movement-inducing coils in most cases is also realized in a plane, only planar translations and rotations with a limited path of significantly less than 360° can be performed herewith.

An alternative concept for movement of the optical elements or of the image sensor is described in the publications Nos. 26 and 47. Here, the corrective rotation is carried out via a gear system by a motor. This structure is disadvantageous because additional play is introduced into the kinematic system by use of a gear system for transmitting the rotation of the motor to the image sensor. A gear system, due to the basic physical principle of action, is in principle afflicted by play and therefore is to be assessed as imprecise and susceptible to vibrations and impacts. This has the result that the determined and moved-to position of the image sensor after a correction, even at rest, still exhibits play and is thus moveable. Neither electronically nor by a sensor can this be remedied because the play leads to a permanent compensation attempt by the electronics which means an increased basic noise of the position sensor data and, in addition, results in an increased power consumption. An exact position cannot be maintained permanently. This is the reason for possible blurriness and bad imaging quality, in particular in environments subject to vibrations. Moreover, operation delays in case of a directional change must be taken into account because first the play up to the point of contact of the oppositely positioned thread flanks must be overcome before the gear system is able to transmit the movement into the opposite direction. Due to the friction-afflicted function of a gear system, wear in the form of abrasion is to be taken into account in addition so that an increase of the problems is to be expected.

Finally, the described mechanical structure means an enlargement of the entire system size.

Moreover, many systems have no exact or long-lived mechanical system. As examples for this, the publications Nos. 14, 20, 27, 36, 37, and 49-51 can be used. Here, a component group arranged in the optical beam path is supported by rigid sliding surfaces against a fixed stop or the housing. Since a sliding support, due to the physical principle of action, is however in principle also afflicted by play, movements cannot be guided precisely. This play leads already for minor vibrations to an increasing precision loss by increased wear and abrasion. In summary, it can be said that a sliding support, in spite of a precise mechanical system, represents an imprecise basis with great susceptibility to vibrations so that a permanent compensation work of the sensors and mechanical system is to be expected, which leads to a precision loss and increased power consumption.

In order to counteract this, various concepts are worked on. One of the theoretically best solutions is represented by the pretension of the mechanical structure in combination with the use of rolling bearings. Due to the continuously proceeding miniaturization of camera systems, in practice however these elements in almost all cases are no longer used, as is conspicuously apparent in publications Nos. 11-16, 18, 20-27, 31, 39, and 46-52. Few inventions have recognized this problem and have integrated elements for pretensioning, but embodied so greatly miniaturized or locally limited that an optimal technical effect is not obtained. This must be considered disadvantageous for the kinematic or mechanical system.

As examples of such a pretension by individual punctually acting springs, the publications Nos. 29, 32, and 38 can be relied on in this context. These technical realizations lead to the sensor plane not being uniformly pretensioned which is additionally reinforced by manufacturing tolerances. Moreover, the inventions disclosed in the publications Nos. 23, 29, and 31 employ only a few individual rolling bodies which each are supported against a locally limited raceway.

Material and geometry and the minimal number of rolling body bearing seats, in addition to a very limited movement range, lead also to a non-uniform support of the image sensor plane. In case of occurring vibrations and impacts, a bad imaging quality and blurring may occur due to the afore mentioned embodiments. The reason for this lies in tilting and/or displacement of the sensor plane relative to the imaging lens system due to a weak non-uniform pretension and support.

Moreover, there are technical solutions (compare publications Nos. 19 and 28) which support springs at a structure which is a part of the external housing or is rigidly connected thereto for pretensioning the imaging unit. This has the disadvantage that (direction-dependent) a spring force counteracts the corrective movements of the sensor surface and must be overcome. This makes it necessary to employ, on the one hand, actors of larger dimensions and also leads to a higher power consumption during operation. In order to enable rotations by more than 360°, the spring, beginning at a certain point, must also be rotated for this purpose because additionally the friction between spring and supporting structure must be overcome in order to perform the desired movement. In any case, in these systems the rotational movement can be considered as being impaired because it is hindered or prevented by an unfavorable mechanical structure at all times. In addition, an abrasion of the stop surface is created due to the resulting friction between spring and spring stop surface.

Systems which enable complete rotations of at least 360° are described in an exemplary fashion in the publications Nos. 11-16 and 47. In particular, the unfavorable kinematic and mechanical structure and the lack of play-compensating components are to be emphasized likewise as being disadvantageous, as described above.

It must be added that all examined and described systems which contain corrective units for compensation of vibrations and slanted positions are not capable of adjusting retroactively the distance of the imaging surface to the imaging optical system (lenses etc.) or the support surface of the lens. Therefore, neither settling effects, manufacturing tolerances, and wear can be compensated nor is it possible to precisely (re)adjust the flange focal distance. The result is an increasing blurring of the recorded images. Instead, many measures are developed in order to circumvent such an adjustment. They can be correlated with two basic concepts: rigid systems with fixed optical elements and thus fixed focus and sharpness and systems which permit the change of optical elements for adjusting zoom and sharpness.

Examples of the first concept are provided in this context by the very basic embodiments in the publications Nos. 11-13, 15, and 30. Here, the imaging system of lenses is fastened at the housing at a fixed distance to the image sensors so that only a one-time calibration (during initial assembly) is possible. Accordingly, the position of the optical elements relative to each other cannot be changed which results in a fixed focus and sharpness. An adaptation to external environments, e.g. interchangeable lenses, is thus not possible.

In addition to the movement of the image sensor by coils and permanent magnets or piezo actors, in particular a further kinematic and mechanical structure is employed. It is described in an exemplary fashion in the publications Nos. 13 and 15. A structure carrying the image sensor of the mechanical system is braced and supported in this context by ball bearings directly at the tube containing the lenses or at the housing so that the image sensor can be freely moved for correction at a radially fixed position behind the imaging optical system. The lack of a mechanical pretension however leads to bearing play in axial direction relative to the imaging lens system. During a corrective movement, the distance of the image sensor to the optical system may change which, in addition to a non-smooth movement, leads to changing blurriness which, under the influence of external vibrations and impacts, may increase in intensity.

In order to prevent the afore described blurriness as a result of bearing play, in many inventions the imaging unit is fixedly connected with the imaging optical system and supported mechanically as a unit. This concept finds exemplary realization in the publications 14, 18-20, 26, 39, and 51. This implies however that the imaging system which now contains the complete optical path must be moved for correction. This represents a great disadvantage because, on the one hand, the mass inertia of this imaging system requires significantly greater actors compared to systems that must only move the imaging unit. On the other hand, this structure is to be considered as being sluggish, in particular for fast corrections with long travels and rotations, which makes impossible a compensation of vibrations and slanted positions in real time. Moreover, functional component groups that can adjust elements (e.g. lenses, lens groups etc.) in the optical beam path must be fastened additionally to the imaging system. This would result in a further increase of the total weight to be moved for a correction. In addition to an enlargement of the external dimensions of the whole system, an increasing sluggishness of the corrective movement and the need for even larger actors would result therefrom. Finally, the fixed, non-detachable connection of the imaging optical system with the image sensor prevents the modular adaptation of the optical elements to different light conditions and requirements. It is not possible to attach further lenses by means of an interface (bayonet mount).

In order to enable such a modular adaptation of the camera system, in some developments (compare publication 31) mechanical interfaces are integrated for this purpose. Since this bayonet mount in general is fixedly connected mechanically with a housing in front of a movable image sensor, there is here the possibility to mount interchangeable lenses without affecting the corrective mechanism of the image sensor. However, all of these systems, which are provided with a bayonet mount and comprise additionally electromechanical units for compensation of vibrations and slanted positions, have no pretensioned support which moreover is not capable of correcting complete rotations. Also, none of these systems enables the retroactive precise adjustment of the flange focal distance between image sensor surface and bayonet mount connecting flange. In particular, all camera systems based on so-called flex-rigid printed circuit boards have no integrated precise mechanical system, secured against rotational release in accordance with current standard, for (retroactive) adjustment and fixation of the flange focal distance.

Systems in which the imaging unit is connected fixedly with a bayonet mount and is mechanically supported as a unit are subjected to comparable problems and disadvantages as described above. Moreover, it can also happen in this context that large and heavy lenses must be used. After their attachment, they are a component of the imaging system and, in case of a correction, must therefore also be moved. Also, functional component groups for adjustment of zoom and focus must be additionally attached externally on the entire imaging system which may lead to the internal corrective drive to be dimensioned too weak for performing a complete corrective movement (in real-time) of the entire imaging system.

In order to stabilize and compensate the orientation and position of the entire camera in case of occurring large movements in space, external manipulation systems are used. These systems are referred to as steady cam systems and are comprised substantially of three actor component groups, one each per spatial movement axis, in addition to position sensors for determining the actual orientation in space. In this context, each of these component groups can perform a position compensation by rotation that is limited to the correlated axis. By the superposition of these individual corrective rotations about the longitudinal axis (roll), transverse axis (pitch) and vertical axis (yaw), each movement in space can be compensated in this context such that the camera housing is oriented parallel to the horizon. With the prerequisite of a known relationship between the orientation of the image sensor relative to the camera housing, it is thus possible to orient the horizon of the recorded image in the ideal situation perpendicular to the direction of gravitation.

The search in regard to prior art in this respect has found that such systems (compare publication Nos. 40-44) are sometimes very large and bulky. Also, it must be added that the few systems which are capable of compensating complete rotations of the camera housing about the optical axis (roll axis) have no completely encapsulated structure that is protected from external influences.

As an example for this, the publication No. 45 can be considered. Here, no protection of the moved elements (e.g. the camera platform or camera head) exists so that impairments of the free corrective movement by external influences cannot be prevented, which may lead to complete blockage.

In relation to the here submitted invention, it can be summarized that different solutions are known for stabilization of optical elements or observation devices. The afore described known constructions appear however suitable only for the respective desired application. All systems with an integrated electromechanical correction system that enable a compensation of at least one complete rotation have an unfavorable kinematic and mechanical structure and lack play-compensating components. In particular the omission of a pretensioned support in combination with a play-afflicted mechanical system leads to neither being able to guarantee a defined position of the image sensor nor being able to compensate manufacturing tolerances, settling effects, and wear, which has the result of a non-smooth movement and increasing blurriness of the recorded images. Moreover, the extremely limited movement range of almost all of the correction systems is based on the use of local coils in combination with permanent magnets, piezo actors or locally movement-limited support so that these published camera systems with corrective mechanical structures do not enable a complete rotation. The use of friction-afflicted and partially non-uniform support of optical components reinforces these problems by the tendency to increased wear and additional play. Not least, the lack of elements with which the distance of the image sensor to the imaging lens system can be calibrated and readjusted, in particular in systems, that enable by means of a bayonet mount the use of interchangeable lenses, prevents the precise adjustment of the flange focal distance and thus of the sharpness of the recorded images. Finally, it should be noted that currently there is no camera system that can be miniaturized and comprises a system structure which enables the flexible combination of the internal functional modules such that camera systems can be achieved that are specialized, matched, and retrofitted to the planned use and the desired functional range.

OBJECT

The invention has the object to provide a system structure for image recording, image stabilization, and image correction with an optical observation device which can be used as variably as possible at high precision and, as needed, can be adapted to various lenses.

SUMMARY OF THE INVENTION

This object is solved according to the invention by an observation system with an image recording unit comprising an imaging surface, wherein the image recording unit is movable along an optical axis and is supported without play under the action of a mechanical pretension induced by at least one spring element and the observation system interacts with at least one functional unit for adjusting the flange focal distance in such a way that by an axial movement of the image recording unit along the optical axis a continuous adjustability of the flange focal distance is achievable. Moreover, this object is also solved with a system structure characterized by an observation system with an image recording unit comprising an imaging surface, wherein the image recording unit is rotatable about an optical axis and is supported without play under the action of a mechanical pretension induced by at least one spring element and the observation system interacts with an actuating member or an actuating unit in such a way that the image recording unit with the whole system being held in an arbitrary position, by rotation about the optical axis can be aligned relative to a respective recording position, wherein a pivot angle of more than ±360° can be compensated by the actuating member or the actuating unit.

The system structure according to the invention for image recording, image stabilization, and image correction with an optical observation device which is to be arranged within a region of a housing concept comprises an observation system with an image recording unit comprising an imaging surface. The image recording unit is slidable along an optical axis in this context and is supported without play under the action of a mechanical pretension, induced by a spring element. The observation system interacts moreover with at least one functional unit for adjustment of the flange focal distance in such a way that by an axial displacement of the image recording unit along the optical axis a continuous adjustability of the flange focal distance can be achieved or is achieved.

The flange focal distance, which usually describes the distance of the imaging surface of the image recording unit or of the image sensor relative to the imaging optical system (lenses etc.) or the support surface of the lens (so-called lens mounting surface or lens support surface) can thus be precisely adjusted. The adjustment of the flange focal distance can be performed even after mounting of an arbitrarily configured lens. The lens mounting surface is preferably arranged in the region of an external structure module or another component that forms at least a part of a housing.

In contrast to the conventional use of intermediate rings or other "discrete" spacer elements, an optimal image sharpness adapted to the respective lens or other optical element can be adjusted due to the continuous adjustment of the flange focal distance.

The mechanical pretension which is induced by the spring element ensures a play-free support of at least the image recording unit. In this way, an exact axial positioning of the image recording unit—in particular also for movements and/or vibrations of the system structure—is provided so that an optimal adjustment of the image sharpness is ensured.

Preferably, the optical axis extends centrally through the image recording unit and in particular centrally through an eye of the system structure allowing light to pass to the image recording unit.

In regard to the here described and illustrated embodiments and configurations, the axes which are described in the following as "optical axis of the imaging unit" and as "optical axis of the lens connecting flange" are identical with the afore described optical axis. Moreover, the optical axis is identical with the "Z axis". The expressions "in Z direction" and "along the optical axis" are used synonymously in the following.

Moreover, "position" refers to an orientation of the image recording unit and/or of the whole system and/or of parts thereof which is variable by rotation about a roll axis which is in particular identical with the optical axis. This axis is referred to in the following also as "Z axis". On the other hand, "orientation" means the three-dimensional spatial orientation of the image recording unit and/or of the whole system and/or parts thereof in space, which is variable by rotation about the roll axis, pitch axis and/or yaw axis.

Preferably, the system structure comprises a digital photo camera and/or a digital camera as an observation device.

In a further embodiment of the invention in accordance with the invention, the image recording unit or the image sensor is rotatable about the optical axis as well as supported without play under the action of a mechanical pretension which is induced by a spring element. In this context, the observation system interacts with an actuating member or an actuator such that the image recording unit, with the whole system being held in an arbitrary position, by rotation about the optical axis can be oriented or is oriented in a respective—for example, horizontal—recording position. The actuating member can compensate in this context a pivot angle of more than ±360°. In this way, a permanent, in particular horizontal, recording position of the image recording unit can be ensured so that slanted positions as well as complete rotations as well as rotations exceeding them can be compensated in real time and the system is capable of completely utilizing the available image recording surface of the image recording unit.

As a horizontal reference plane in this context a plane is to be utilized which is perpendicular to the gravitation direction. The alignment of the image recording unit relative to a predetermined recording position can be realized in particular independent of the orientation of the whole system.

The mechanical pretension prevents that during the rotational corrective movement the distance of the imaging surface to the lens mounting surface changes. Accordingly, a smooth run of the corrective movement as well as a constant image sharpness, in particular under the effect of external vibrations and/or impacts, are ensured.

The aforementioned object is thus solved also by an article by an observation system with an image recording unit comprising an imaging surface, wherein the image recording unit is rotatable about an optical axis and is supported without play under the action of a mechanical pretension induced by at least one spring element and the observation system interacts with an actuating member or an actuating unit in such a way that the image recording unit with the whole system being held in an arbitrary position, by rotation about the optical axis can be aligned relative to a respective recording position, wherein a pivot angle of more than ±360° can be compensated by the actuating member or the actuating unit.

In a further preferred embodiment of the invention, functional surfaces of the functional unit for adjusting the flange focal distance are configured such that an adjustability of the flange focal distance secured against displacement can be achieved or is achieved. In this context, it is provided that, for fixation of the adjusted flange focal distance, a friction-fit and/or form-fit connection of a drive element and an actuator of the functional unit for adjusting the flange focal distance is configured such that at least an inherent self-locking action is achieved. In this way, an even safer positioning of the image recording unit is achieved. Preferably, the functional unit for adjustment of the flange focal distance is realized as actuators—for example, based on a tooth system—acting with friction fit and/or form fit at a defined distance. In particular, the functional unit for adjusting the flange focal distance comprises in this context at least a self-locking worm gear.

In a further preferred embodiment of the invention, the observation system comprises a mechanical base as well as an observation unit accommodating the image recording unit. The observation unit in this context is moveable relative to the mechanical base along the optical axis and is supported without play under the action of the mechanical pretension which is induced by the spring element. In this way, for adjusting the flange focal distance only a relatively small part of the system structure must be moved whereby it can be performed more precisely. In particular, it is not required to move the entire observation system axially so that the latter can be fixed by means of the mechanical basis in relation to the lens mounting surface In a further preferred embodiment of the invention, the functional unit for adjusting the flange focal distance is integrated in the observation system and at least partially is fixed relative to the mechanical base. In this way, a compact construction can be achieved. Moreover, the force transmission of an in particular rotatory adjusting movement that is introduced by the user or by an integrated motor is realized within a space as small as possible so that the precision of the adjustment of the flange focal distance is positively affected. That the functional unit for adjusting the flange focal distance is fixed at least partially relative to the mechanical base is to be understood such that it is fixed relative to the mechanical base with the exception of at least one actuating member movable parallel to the optical axis.

Preferably, the functional unit for adjusting the flange focal distance comprises in this context a—preferably self-locking—worm gear that is fixed relative to the mechanical base and interacts with a movable actuating member—in particular a thread.

In a further advantageous embodiment of the invention, the observation system is configured such that the freedom of movement of the observation unit is limited to a translation parallel to the optical axis. Preferably, the observation system is configured such that the freedom of movement of the observation system is limited to a translation parallel to the optical axis by a spatial parallel displacement of a movement axis of an actuating member of the functional unit for adjustment of the flange focal distance, in particular of a thread. In this way, in particular the rotational degree of freedom about the optical axis can be furthermore blocked and, in this way, an increased precision for the adjustment of the flange focal distance can be achieved. Alternatively or in addition, also tongues in connection with a corresponding groove extending along the optical axis can be provided for limiting the freedom of movement.

In a further particularly preferred embodiment of the invention, the functional unit for adjusting the flange focal distances is embodied such that an—for example, rotatory—adjusting movement introduced by the user is transformed into a translatory displacement of the image recording unit (or of the observation unit accommodating the image recording unit) along the optical axis and thus a calibration of the flange focal distance can be achieved. Preferably, in this context a tooth geometry transmits a rotation, imparted in particular by the user, onto a substantially conformingly embodied counter tooth geometry which, in turn, by means of a further friction-fit and/or form-fit connection—for example, a thread—induces a displacement of the imaging surface of the image recording unit along the optical axis. The adjustment of the flange focal distance can thus be adjusted comfortably and precisely by a single adjusting movement induced by the user. Preferably, the surface normal of the imaging surface of the image recording unit in every adjustment position extends parallel to the movement axis of the translatory displacement (here parallel to the optical axis). In this way, in particular a complex adjustment of the flange focal distance by means of an adjustment of several actuating members to be performed in particular sequentially is avoided.

In a further advantageous embodiment, it is provided according to the invention that the spring element that induces the mechanical pretension required for the play-free rotational support of the image recording unit is embodied to extend completely circumferentially about the optical axis in circumferential direction. In this way, it is achieved that the imaging surface of the image recording unit is pretensioned uniformly so that even during the rotational corrective movement a precise support and thus optimal image sharpness is enabled.

According to a further advantageous embodiment of the invention, the system structure comprises a single spring element that induces a mechanical pretension for play-free support of the image recording unit with regard to its displaceability along the optical axis as well as with regard to its rotatability about the optical axis. The spring element enables a play-free support along the optical axis wherein a translation of the image recording unit along the optical axis as well as a rotation of the image recording unit about the optical axis is possible. Accordingly, a system structure with a few components is realizable wherein a precisely adjustable flange focal distance as well as a precise correction of slanted positions and complete rotations is provided. The system structure is thus less susceptible to failure.

The aforementioned object is in particular also solved by a system structure for image recording, image stabilization, and image correction, with an optical observation device that is to be arranged in the region of a preferably cylindrical housing concept, is configured such that the whole system forms a functional unit comprised of several functional modules with integrated observation system which, in the state of use, are connected by mechanical pretension without play and can be aligned relative to predetermined recording positions. In this context, the image recording unit is supported controllably in a central module of the functional unit and, in relation to a system-fixed lens mounting surface provided in the region of an external structural module, is at least axially adjustable in such a way that, independent of the functional unit that is moved in operating position, the image recording unit in its respective position can be aligned relative to the respective recording position.

While the system structure in this context enables the construction of intelligent observation systems, specialized in regard to the respective application and the desired functional range, due to a flexible combination of the internal functional units, the individual operating functions of the system can be controlled automatically as well as manually. In this context, means for precise correction of shaking, slanted positions, and complete rotations are integrated as well as a precise, reliable and secure adjustability of the technical and geometric parameters, e.g. of the flange focal distance, and a native interoperability with substantially arbitrary lens systems and image processing systems. The system-internal adaptation to changing conditions of use is as easily realizable and provided by an addition or change of the module selection and module position in the whole system. By avoiding or reducing the disadvantages of known realizations, in the following various embodiments are explained in an exemplary fashion in this context.

Based on this, the device of this invention is embodied as a system of specialized modules that can accommodate at least one observation system, contains at least one control component group, and whose functional units can be moved optionally by at least one actuating member.

In particular, it is provided that the component groups which form the functional unit are provided with a digital photo camera and/or a digital camera as respective observation device.

The concept of the "automatic" operation possibility of the observation system provides that by means of the output signal of at least one integrated sensor the position of the image recording unit can be immediately operated or controlled. In particular, it is conceivable that corresponding intermediate members for positioning and/or adjusting of the observation system enable at the latter further adjusting possibilities which are substantially independent of the mounting position of the whole system.

For this purpose, the observation device can be inserted in particular into a component group interacting with an actuating member and supported so as to be rotatable about at least one axis so that at least a pivot movement of 360° is possible. This part of the central functional unit provides moreover a compact arrangement of the functional units relative to each other in a tight space whose total point of gravity is preferably positioned on the movement axis which is congruent to the optical axis.

In connection therewith, the pretensioned support of the mechanical functional units must be considered as important so that, on the one hand, an adjustment of the distance of the imaging surface of the observation system to the object mounting surface is enabled and, on the other hand, a highly precise play-free support is achieved. A reliable automatic compensation of imprecisions, settling effects, thermal expansions or the like is ensured in this way as well as a congruence of the optical axes of image recording unit and lens connecting flange or of an optional movement axis.

For further enhancement of the precision and imaging exactness, it is in particular provided that a functional unit for calibration of the axial distance of the mounting surface of the lens bayonet mount to the imaging surface of the observation system (so-called flange focal distance) can be integrated or is integrated. The functional surfaces which are decisive for this can be embodied in this context such that an adjustment movement which is imparted by the user induces an axial adjustment of the safely lockable distance of the lens support surface relative to the image recording unit. In addition to a highly precise adjustment of the sharpness of the recorded images, also the compensation of imprecisions of external optical imaging systems is made possible in this way.

The envelope structure of the device that at least in sections is housing-shaped is preferably designed in this context such that in the region of the image recording unit of the observation system an eye—for example, with a corresponding adaptable or adapted connecting flange—is opened so that a lens can be fixed in the position of use and can be operated with at least one correlated control system, in particular such that a fully automatic as well as likewise manual operation of all actuating members of motorized as well as unmotorized lenses, in combination with additional definable or defined actuating modules, is possible. In this way, a minimal size can be achieved and it can be ensured that lenses and actuating systems are mounted so as to be optimally accessible and operable and can interact ideally with additional component groups without other functions being affected.

It has been found to be particularly important in regard to practical use that, in addition to a modular flexible combination of functional units and the permanent adjustability of the geometric and technical parameters of the whole system, at least the observation device can be positioned selectively by means of an actuator such that, independent of the spatial orientation of the device, a (pre)determinable or (pre)determined position relative to the horizon can be achieved or is achieved.

In particular, it is provided that the observation device exhibits a permanent alignment relative to a predetermined position by means of the sensor integrated in the inner module or in the functional unit and of the actuating member formed by the at least one servomotor.

This alignment can be performed by several functional units so that the entire substantially automatically performed stabilization is comprised of superimposed individual corrective movements specialized relative to the movement to be corrected. In this way, large movements as well as shaking and vibrations of movement sequences and operating actions—in particular in permanent relation to a predetermined position and to the optical axis—can be corrected and stabilized in a synchronized fashion. Thereby, conventional steady cam systems or the like for correction of movements of the camera are superseded and replaced by an integrated system that can be automated or is automated.

Moreover, it is preferably conceivable to additionally correct, synchronized across the system, tilting and/or deviations at least between the optical axes of the image recording unit and of the lens connecting flange—for example, due to manufacturing tolerances and/or mounting tolerances, vibrations, a manual operation etc.—by means of a further functional module.

It is understood that the control component group can also be provided with an activatable control program so that at least the automatic recording of an observation situation can be switched on or off, as needed, as well as the recording parameters—at least in regard to image section, brightness, and image sharpness—can be controlled and adjusted. Also, it is conceivable that, by an external signal transmission, corresponding auxiliary programs can be started and thus additional control and adjusting functions in the region of the observation system can be triggered.

It is understood that the device is dimensioned in particular optimally such that in addition to the afore described components also a power supply—in particular a battery or rechargeable battery—can be integrated or is integrated in the housing structure and/or the device can also be connected to an external power supply. Also, it should be emphasized that all signal lines required for operation—for example, by plug connectors or wireless—can be addressed at any time independent of the actual position and orientation of the internal movable functional units.

For use in rough and in particular vibration-affected environments, it is moreover in particular important that all components of a functional unit are secured constructively against becoming loose or displaced automatically or accidentally and that the device, at least in the region of the housing-shaped component groups and plug connectors, forms such a sealed system that at least the penetration of water or water vapor as well as solid bodies or other solid, liquid, or gaseous media into the region of the movable and electronic component groups as well as into the optical beam path, even at high external pressure, can be safely prevented. The shape of the support housing that is preferably closed at least in sections thereof enables also mounting of further devices as well as an optimal fixation and spatially independently oriented mounting of the device at freely defined structures by arbitrarily positionable carrying devices.

Preferably, for protecting the whole system from external influences and media at least in the region of the housing-shaped component groups, at least one sealing element is provided that acts in particular, on the one hand, against correspondingly embodied grooves of an inner module and/or of a central functional unit and, on the other hand, against inner contact surfaces of at least one envelope element or an envelope structure that protects against external influences and is exchangeable.

According to a further advantageous embodiment of the invention, it is provided that the observation device, by means of at least one respective actuating member or respective actuator in the region of the inner module or of the central functional unit, is adjustable in regard to its position relative to the horizon as well as to its respective recording parameters (for example, image section, brightness, and/or image sharpness). In this context, in particular at least one actuating member or actuator is provided for each recording parameter.

According to a further preferred embodiment of the invention, it is provided that the system structure comprises at least one integrated sensor, that is connectable or connected with the actuating member or actuator, for alignment of the position of the image recording unit wherein by means of an output signal of the at least one sensor the position of the image recording unit can be immediately operated or controlled.

In this context, by means of an output signal which is generated by at least one integrated sensor, in particular based on the detection of the spatial position and orientation of the whole system, an actuating member can be activated by at least one system electronic device, used for movement of internal functional units, and a substantially automatic operation enabled in this way.

According to a further advantageous embodiment of the invention, it is provided that the observation system interacts at least by a mechanical receptacle or fastening receptacle with the actuating member or with the actuator in such a way that the module, containing the image recording unit, as a resulting functional unit forms a part of the whole system which is pivotable at least about the optical axis and is independent from the lens mounting surface at least with respect to the position.

In a further advantageous embodiment of the invention, the system structure comprises at least one adaptable interface element for mounting an imaging device that surrounds the observation system at least partially and in which the operation system is supported in a guided fashion, wherein the observation system and interface element form a system with full functional range of an observation device.

In this context, it is in particular provided that the interface element comprises an inner geometry which is embodied in accordance with the external guiding and mounting surfaces of the observation system and enables a precisely aligned and centered mounting in the region of the mechanical base as well as the mechanical guiding action and adjusting translatory displacement of the observation unit along the optical axis.

It is understood that, as a result of an embodiment of the interface element that is structurally deeply integrated into the whole system and adaptable at least to different imaging systems and lenses, a safe and easily performable adaptation of the observation system to the respective applications is enabled. According to the invention, it is provided in this context to reliably fix the lens at a mounting surface in the region of an eye of the interface element.

According to a further advantageous embodiment of the invention, it is provided that the observation system with the at least one adaptable interface element and an external envelope structure forms a functional unit which is embodied as a complete observation system.

Preferably, by means of attaching a substantially arbitrary envelope structure, an additional protection of the whole system against external influences can be achieved, as needed. For this purpose, it is provided that in particular at least an inner geometry of the envelope structure is embodied such that the guiding and mounting surfaces of the observation system as well as the external shape of the interface element are coaxially oriented at least in the same direction and centered and, in this way, an additional optimization of rigidity and guiding precision is achieved. Moreover, in this way an additional protection against accidental displacement of the manipulator of a drive element of the functional device, accessible via a correspondingly designed opening, for adjusting the flange focal distance for calibration of the flange focal distance can be achieved.

Moreover, it is in particular conceivable that the manipulator comprises functional surfaces which are accessible via corresponding openings of the surrounding components and enable, optionally by means of corresponding operating tools, a rotation of the manipulator.

The configuration of the at least mechanical structures in the housing-shaped region is in particular additionally embodied such that, on the one hand, for attachment of the whole system to a carrier system in a substantially arbitrary orientation and, on the other hand, for connection of external components, devices, sensors or like attachment parts, mounting geometries are provided, for example. Conceivable is also that they can be embodied preferably alternatively as bayonet mount, thread surface or plug surface. Mounting of the whole system on a carrier system in arbitrary orientation can also be achieved by carrier elements engaging by friction fit and/or form fit the external envelope geometry.

In the context of the modular system structure according to the invention, it is provided also as particularly important to connect the observation system, for integration into the whole system, with an interface rigidly to a central functional unit. In this context, it is conceivable that the interface comprises a surrounding geometry conforming to the external contour of the mechanical base embodied as a guiding and mounting surface which serves for enhancing the mechanical guiding action and adjusting movement of the observation unit along the optical axis and also enables a precisely aligned and centered mounting.

Moreover, it is provided preferably that in the region of the external wall of the interface at least one functional surface can be arranged which, by means of a corresponding securing element—for example, a screw—can be used via an opening for permanent locking against surrounding structures, as needed.

In this context, it is in particular conceivable to substitute the functional properties of the interface by corresponding inherent design characteristics of the external geometry of the observation system and/or further at least partially surrounding envelope structures and envelope modules so that the observation system, without additional adapter elements or interface elements, can be advantageously accommodated or is accommodated in a guided fashion as well as can be fixed or is fixed without play and rigidly to at least one pivotable part of the whole system that is driven by an actuating member.

According to a further preferred embodiment of the invention, it is provided that the observation system containing the image recording unit is supported without play by means of at least one corresponding spring element against at least the lens mounting surface.

The observation system in this context is in particular pretensioned against a connecting flange of the surrounding module by means of at least one pressure surface via a preferably corresponding conformingly embodied counter pressure surface of a stop of a module surrounding at least partially the observation system and at least one bearing element. In particular, the observation system interacts additionally at least through at least one mechanically rigid connection with the actuating member and forms in this way in the form of the central functional unit a precisely centered part of the whole system which is pivotable at least about the Z axis or optical axis and is guided without play. The pressure surface can be provided by an interface which is rigidly connected to the observation unit.

In a further advantageous embodiment of the invention, the construction of the electronic components of the functional unit can be embodied with an at least singular folded system circuit board with flexible connections in sections thereof.

In this context, it is in particular provided that the imaging surface of the image recording unit, which is located on at least one side of a rigid circuit board element that is facing the lens mounting surface, can be moved relative to at least one further rigid circuit board element arranged in the region of the mechanical base and the mechanical base 20. In this way, the advantages of a singular folded system circuit board with flexible connections and rigid regions can be utilized as well as a universal mechanical adjustability of the flange focal distance.

In this context, it is in particular provided to precisely guide in an oriented fashion a circuit board package comprising at least one rigid circuit board element advantageously with heat-conducting distance elements in an at least partially surrounding envelope geometry and preferably fix it securely by means of a pressure plate to a rigid observation unit whose guiding surfaces interact advantageously at least with the mechanical base such that the guiding or movement axis of the observation unit extends exactly congruent with the optical axis of the image recording unit. The optional attachment of optical elements—such as filters, for example—is provided as well as an optional locking action, protected safely against damaging buckling, of at least a flexible connection of the circuit board package with rearward elements of the folded system circuit board.

It is understood that the functional unit for adjusting the flange focal distance can act, freely selectably positioned, on at least any rigid region of substantially arbitrarily folded circuit board package and thus, by the system-wide integration, the maximum flexibility and modularity in the configuration of the whole system can be achieved.

Moreover, it is likewise understood that the functional unit for adjusting the flange focal distance can be optimally integrated and employed also in embodiments of at least electronic system components without flexible connections.

According to a further preferred embodiment of the invention, it is provided that the support of the image recording unit can be expanded or is expanded with a functional unit for correction of tilting relative to the optical axis.

Preferably, a construction which is based on a parallel-kinematic mechanical system is provided whereby in particular a likewise highly precise three-dimensional rotation of the image recording unit about the center of the imaging surface can be realized. Preferably, also a translation of the image recording unit relative to the lens mounting surface is enabled moreover by the functional unit for correction of tilting.

In particular, the functional unit for correction of tilting comprises at least three actuators wherein, by axial length change of respective movement axes of the actuators, a substantially arbitrary manipulation of the spatial orientation of the image recording unit can be achieved.

The actuators are in this context preferably arranged and supported relative to each other such that by the described three-dimensional movement of the image recording unit, in particular of a head component group accommodating the image recording unit, the relative differences of the distances of a reference plane monitored by sensors are minimized relative to each other or are equal to zero in an exactly corrected state and in this way high-frequency tilting can be compensated reliably.

The exact adjustment of the flange focal distance is in this context achieved by the substantially uniform and advantageously synchronized activation of the actuators resulting in translation of the imaging surface. In advantageous embodiment, it is in this context also conceivable that corresponding actuators—for example, on the basis of utilizing the piezoelectric effect—can be used for achieving an optimal positioning precision as well as control speed.

Preferably, gimbal joints and/or flexures are used for arranging the actuators in an advantageous play-free configuration.

In addition to the afore described actuating members, alternative functional units for driving or controlling the at least movably supported component groups are conceivable which can be embodied as a system module that at least partially surrounds the component group to be driven and can be fixed or is fixed substantially arbitrarily along the optical axis. In addition to an (electro)magnetically embodied movement, in particular the advantageous utilization of the so-called piezoelectric principle of action is conceivable in this context.

Preferably, the system structure comprises an in particular annular piezoelectric functional unit with integrated piezoelectric actor elements wherein, based on an intelligent synchronized excitation of these piezoelectric actor elements, a wave form is generated which migrates on the circumference and, by means of the pretension effected by the spring element, transmits a rotational movement, for example, to a rotor element. In this way, an optimal power density with minimal spatial space requirement and at the same time an exactly controllable and service-free adjusting movement can be achieved.

According to a further preferred embodiment of the invention, it is provided that the observation device can be covered or is covered by an accommodating substantially conforming geometry, in particular in such a way that the over all housing-shaped envelope structure in the region of an eye that is correlated with the image recording unit permits fixation of a lens. Preferably, the housing-shaped envelope structure enables the fixation of at least one functional unit for control of substantially arbitrary lenses. In particular, the housing-shaped envelope structure is adaptable or is adapted to substantially arbitrary lens connection standards or flange focal distance standards.

Preferably, it is provided that the observation system can be arranged or is arranged in substantially arbitrary holding geometries with retention of the full functional range and of the adjustability of the electronic and mechanical parameters. In particular, in this context a lens in the position of use can be fixed and preferably operated with at least one correlated control system. In this context, a fully automatic as well as likewise manual operation of all actuating members of motorized as well as unmotorized lenses, in combination with additional definable or defined actuating modules, is possible. In this way, a minimal size can be achieved and it can be ensured that lenses and actuating systems are mounted so as to be optimally accessible and operable and can interact ideally with additional component groups without other functions being affected.

According to a further advantageous embodiment of the invention, for illumination of the scene to be recorded, at the housing-shaped envelope structure at least one functional unit for illumination is provided that surrounds the lens at least partially. In this context, in particular the intensity and color as well as the type of the illumination of at least one illumination element can be adjusted and an optimal illumination of the object to be recorded can be achieved so that additional (partially complex) illumination systems can be replaced. Moreover, in this way, an illumination of application environments can be achieved in which current illumination systems—for example, for space reasons—cannot be employed.

In particular, the functional unit comprises a receiving and/or sending unit. In this way, in a further embodiment of the invention a radio control forming a sender-receiver system can be integrated into the functional unit by means of which the observation device and/or further functional units is/are operable or is/are operated. Preferably, the functional unit is provided with a control program that can be radio-activated.

In a further preferred embodiment of the invention, the system structure comprises an electromechanical component for rotatory signal transmission that is embodied such that all input and output signals, even for a pivot angle of in particular more than ±−360°, are retrievable and operable without limitation. Preferably, the electromagnetic mechanical component is designed such that the imaging surface of the image recording unit, independent of the environmental temperature, manufacturing tolerances or external influences, at all times is located in a precisely adjustable constant distance relative to the lens mounting surface.

Preferably, it is provided that the functional unit, at least in the region of the modules which are embodied as housing-shaped component groups, forms a connecting structure that is at least partially fluid-tight. In this way, the device, at least in the region of the housing-shaped component groups and in particular plug connectors, forms a sealed system such that at least the penetration of water and water vapor as well as solid bodies or other solid, liquid, or gaseous media into the region of the movable and electronic component groups as well as of the optical beam path can be reliably prevented, even under high external pressure.

The shape of the support housing that is closed at least in sections enables in this context additionally mounting of further devices as well as an optimal fixation and spatially independently oriented mounting of the device at freely arrangeable or arranged structures by arbitrarily positionable or positioned carrier devices.

According to a further preferred embodiment of the invention, it is provided that the sending unit comprises a connecting line to storage parts that are arranged at least preferably in the region of the central functional unit such that, even for unlimited rotational movement of more than 360° of the image recording unit, information transmission can be performed. The connecting line can be in this context a wire-bound or fiber-bound as well as a wireless connection, for example, a radio connection.

Preferably, a coaxial signal line is used for signal transmission. In this way, an in particular miniaturized slip ring can be used as connecting line which is operating almost without loss at current conventional video transmission rates. Moreover, the connecting line can also be embodied by a signal transmission element that employs conventional electrical brush contacts (e.g., for power supply) as well as optical and/or magnetic contacts (e.g., for the video signal).

In particular, it is provided that the information transmission is performed to at least one storage part provided in the region of the central functional unit and/or to an exchangeable storage part.

Preferably, the concept according to the invention for information processing and/or information transmission comprises at least one corresponding system electronics which is substantially configured as a functional unit which controls the internal and external system components, wherein in particular at least control units for respective control of an actuating member of the image brightness, of the image sharpness, of the image section, and of an illumination module are provided and, additionally, at least one control program integrated into the system can be activated.

In this context, it is in particular also provided to perform, after mounting of a substantially arbitrary lens, an automatic initialization or query and recognition of the mechanical and electronic parameters. In this context, in addition to a manual input of the adjusting range, in particular at least an automatic determination of the end stops delimiting the movement range of the respective aperture drive is provided, such that the actuating unit of the lens for opening the aperture is automatically moved by a correspondingly correlated functional unit until the adjusting range, which is defined by the synchronized recorded positions of the mechanical end stops, is determined. For ensuring a reliable and precise determination of the adjusting range, it is also conceivable to additionally take into consideration the at least sensor-based measured brightness value, for example, of the image recording unit, in the determination of the end stops such that, in the simplest case, end stops are determined respectively by the minimum (first occurring adjusting position without impinging light or sensor measurement) and the maximum (first occurring adjusting position with maximum brightness) of the brightness value. An exact correlation of f-stop or mechanical adjusting position relative to the aperture can thus be precisely calculated or interpolated by use of the respective known aperture range. In addition to an advantageous manual adjustment of an exact aperture value, a precise automatic control of substantially arbitrary lenses in general and in particular at least of the aperture can be achieved in combination with an automatable control of the electronic image parameters. This method is provided in analogy for all further actuating members of a mounted lens.

It is in particular provided that the central system electronics is constructed of a plurality of individual functional units that can be arranged arbitrarily in the entire system region. Preferably, the electromechanical unit for at least rotatory connection of the central control unit with at least one interface module can be arranged also arbitrarily in the entire system region.

Preferably, the functional unit forms an at least completely three-dimensionally pivotable observation system, controllable in regard to position and orientation, by connecting external control members to the integrated system electronics via substantially arbitrary interfaces that are however at least sealed against external media.

It is in particular conceivable that in this way an intelligent communication with further systems can be achieved. Taking into consideration the afore described advantageously adjustable and scalable mechanical and systematic embodiment of the whole system, it is possible—for example, by a synchronization with at least one further (camera) system—to provide a multi-camera system in such a way that, for example, a functional unit can be provided that is embodied of two whole systems which are positioned relative to each other at a distance that is at least continuously adjustable and that is capable of making intelligent three-dimensional recordings which match very precisely the real perception. As a result of the system-inherent flexible scaling, by means of at least one geometric enlargement as well as reduction of the whole system, the minimally and maximally achievable distance of the individual synchronized (camera) systems can be moreover reduced or enlarged.

Moreover, an additional storage part provided at least in the region of the central functional unit and/or a storage part which can be exchangeable as needed for recording and future evaluation of recordings can be utilized. In this way, it is achieved that the whole system can be integrated seamlessly into existing systems as well as can be expanded and controlled with substantially arbitrary devices. Also, it is provided that, for example, by means of sensor-based output control signals for actors that are additionally acting on the X axis and Y axis, corresponding actuating members can be connected and activated in such a way that a complete orientation correction of the image sensor and of the whole system in the three-dimensional space can be achieved.

In particular, it is provided that, in the region of a support housing accommodating the observation device, respective functional surfaces and functional elements are provided in such a way that, at respective connecting points of the support housing, external components, devices, sensors or like attachment parts can be arranged or are arranged.

It is understood that components of a power supply, not illustrated in detail, for the control of the system may be provided, in particular batteries or rechargeable batteries. Preferably, it is provided that in the region of the support housing a power supply, in particular in the form of a battery or a rechargeable battery, can be integrated or is integrated. Likewise, it is conceivable that the whole system can be connected or is connected to an external power supply.

It is understood that substantially freely selectable external system geometries are conceivable. Thus, an adaptation to arbitrary structures is possible and the whole system can be achieved for an installation in further functional units, modules or systems.

In addition to the movement generation on the basis of an (electro)magnetic or piezoelectric principle of action, optionally further actors—for example, fluid operated or compressed air operated and conventional (shaft) or gear-based (step) motors—are also conceivable as well as an expansion of substantially arbitrary functional units for movement generation with corresponding electronic and/or mechanical functional units (e.g., encoders) for exact reproduction of adjusting movements and/or for a reliable movement into discrete (stored) positions and orientations. In addition, it is conceivable that by means of a reference sensor device—for example, by means of a further sensor in addition to the orientation sensor—the control precision of the respective correlated actor system can be increased.

It is understood that, aside from the described embodiments, for configuration of a pretensioned mechanical system alternative spring elements such as, for example, spiral springs, wave springs, plate springs, flexure springs or pretension-inducing functional units that are water-, air-, and oil pressure-activated or the like—as well as support elements—for example, rolling bearings, magnetic bearings, flexure bearings or similar bearings—are conceivable.

Moreover, it is in particular conceivable to embody respectively the (rotatory) signal lines that cross the boundaries of the functional units and modules, of the whole system to the exterior and as an alternative to the described internal transmission by means of the described electromechanical component, in a contactless, optical, magnetical or radio-based way—for example, by means of a corresponding (signal line) functional unit.

It is also understood that a system structure that is completely protected against external influences and media can be achieved elastomer-based or polymer-based as well as by metallic sealing surfaces. Corresponding sealing elements can be embodied in this context also in a multi-part configuration. Moreover, e.g., for weight reduction, it is conceivable that the whole system at least in sections thereof is embodied without sealing elements and the mechanical structure for this purpose is provided as a rigid unit which surrounds at least partially the inwardly positioned modules and functional elements. In particular, in this context the external structure can make accessible, for example, the control elements of a connected lens by correspondingly designed openings and in this way enable a manual operation thereof as well as ensure protection of the surrounding functional elements and modules from external influences and accidental displacement.

BRIEF DESCRIPTION OF THE FIGURES

Further details and advantages of the invention can be taken from the following described, schematically illustrated embodiments; it is shown in.

DETAILED DESCRIPTION OF THE INVENTION

Figure 1:
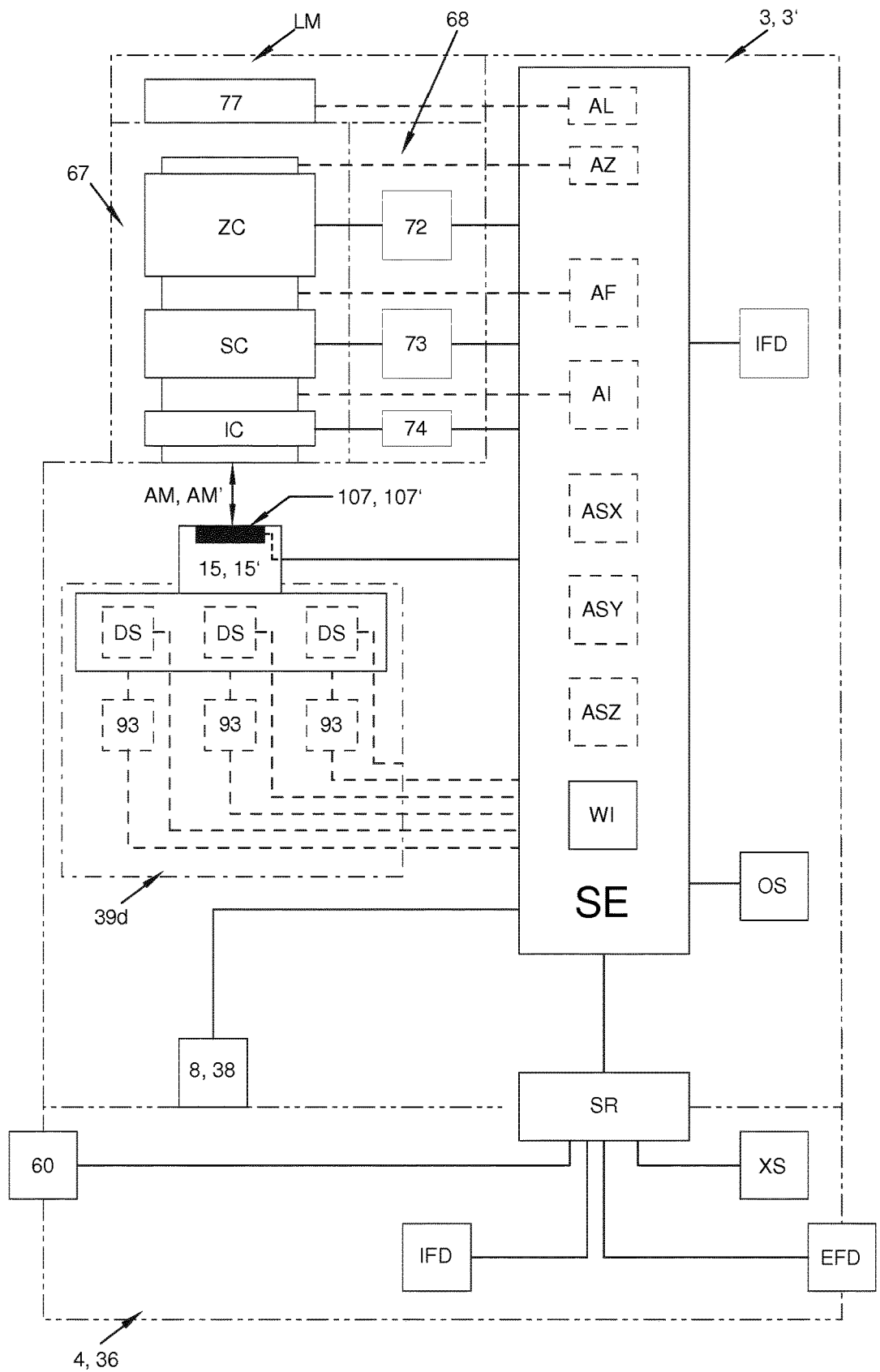
FIG. 1 a system diagram.

The features of the embodiments of the invention explained in the following can also be subject matter of the invention individually or in other combinations than illustrated or described. In the following, elements of the invention that are acting in the same way are provided with uniform reference numbers, in case this is expedient.

The axes which are described in the following with "optical axis of the imaging unit" and with "optical axis of the lens connector flange" are identical with the afore described optical axis in respect to the here described and illustrated embodiments and modifications and are referred to by the reference characters OA or OA'. Moreover, the optical axis is identical with the "Z axis" which is provided with the reference character Z. The expressions "in Z direction" and "along the optical axis" are used synonymously in the following. In the following Figures, the X axis corresponds to the pitch axis, the Y axis to the yaw axis, and the Z axis to the roll axis.

First Embodiment

Figure 2:
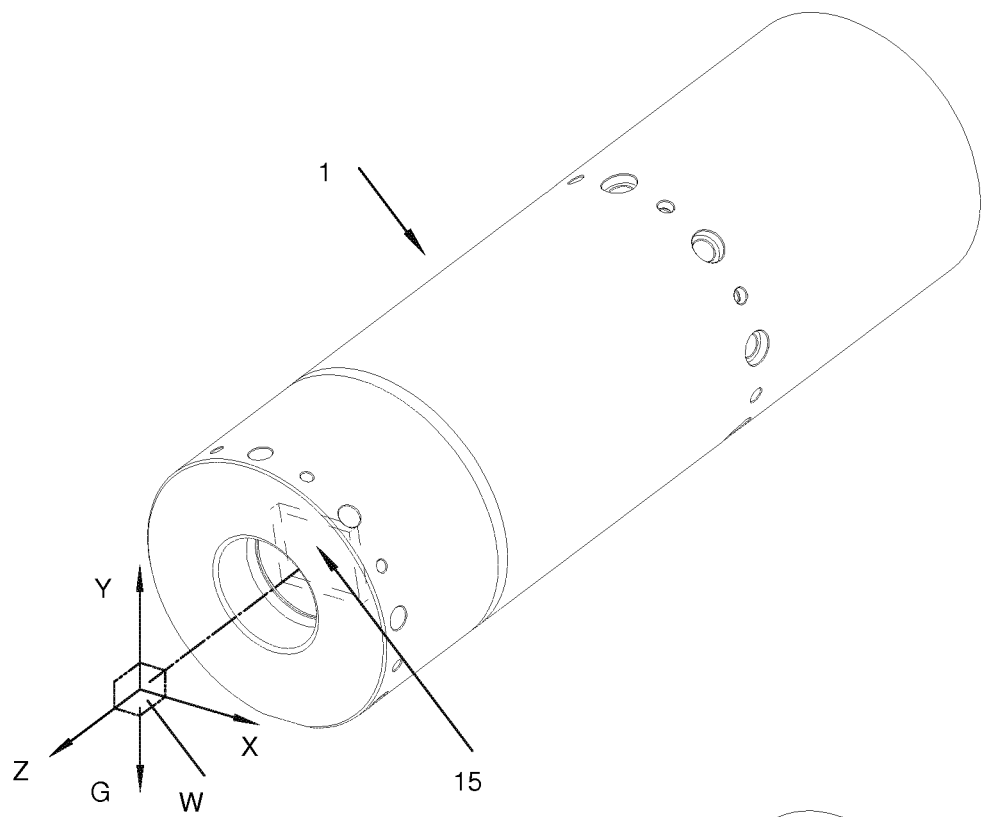
FIG. 2 an isometric front view of the whole system according to a first embodiment in the operating state.
Figure 3:
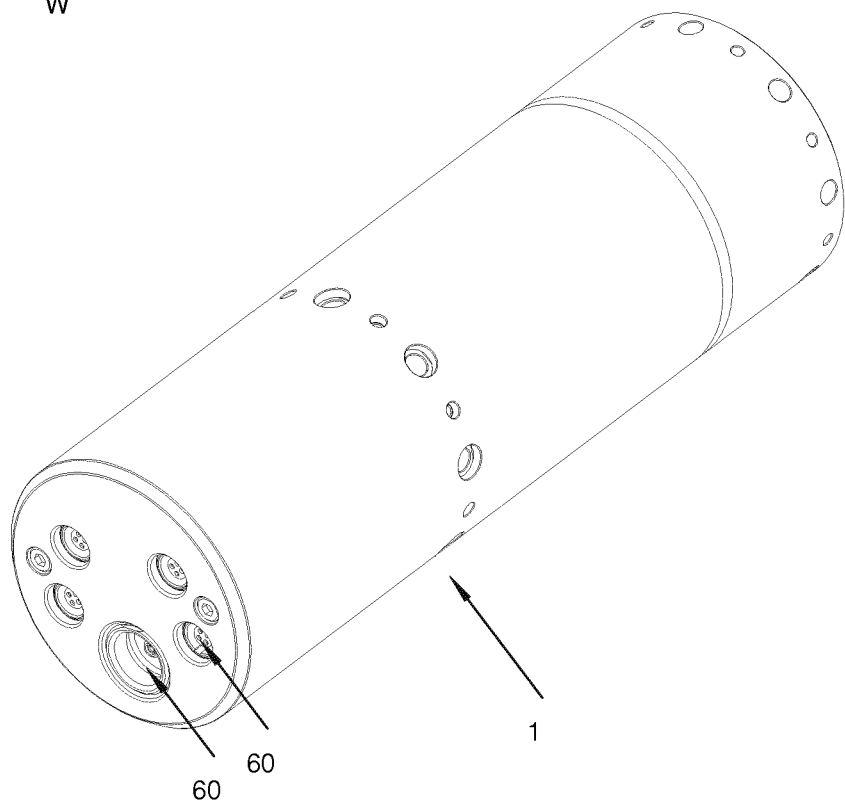
FIG. 3 an isometric rear view of the whole system according to a first embodiment in the operating state.

In combination with the functional structure according to FIG. 1, the perspective illustrations according to FIG. 2 and FIG. 3 illustrate a possible first embodiment of the concept of the invention in the form of a respective isometric front view and rear view of the whole system 1.

Figure 4:
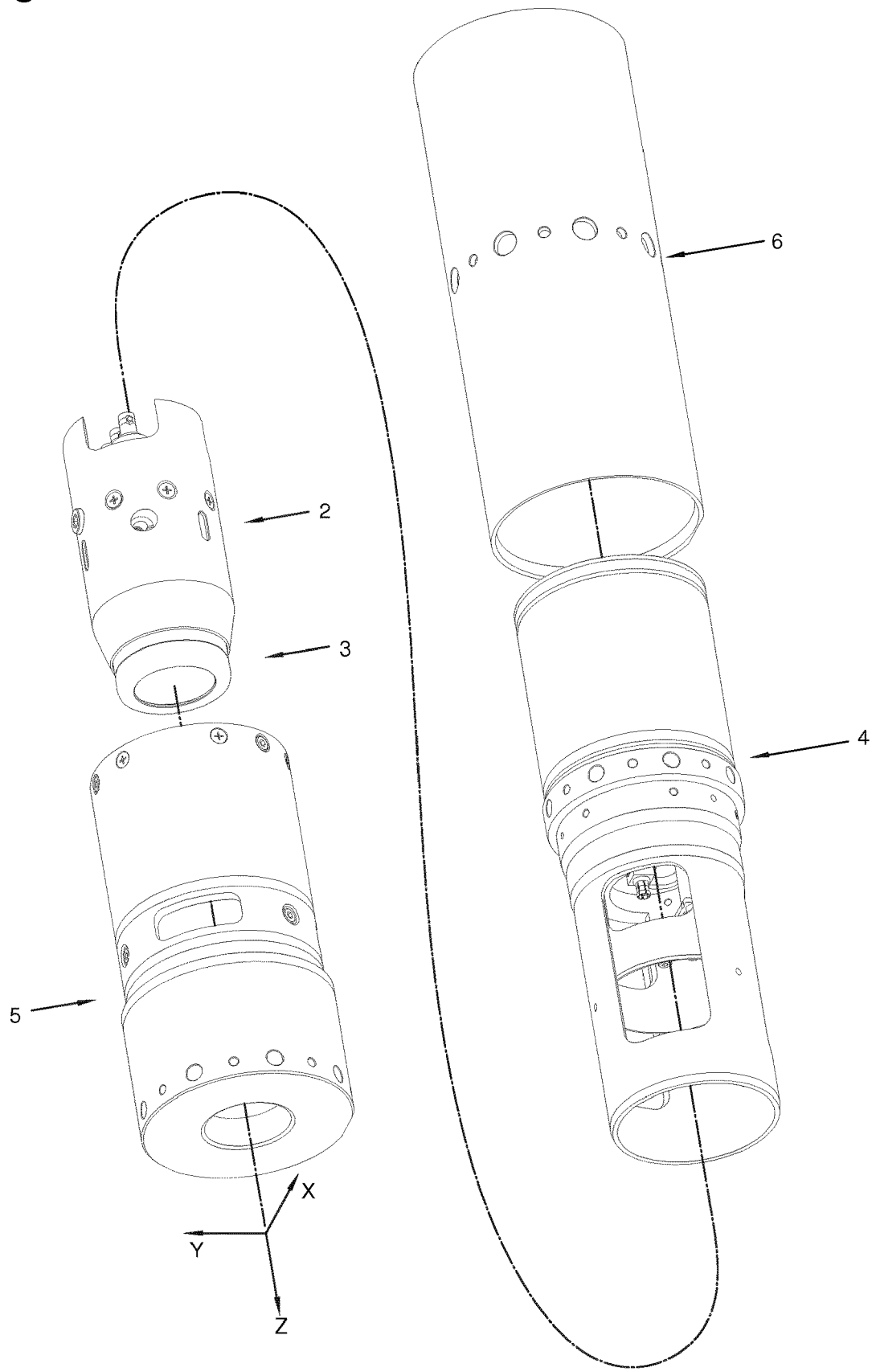
FIG. 4 an exploded view of the system structure according to a first embodiment.

The concept according to the invention provides that the whole system 1 is now embodied as a functional unit which can be optimized with regard to different application situations. This functional unit comprises in this context a modular system structure according to FIG. 4 in such a way that, based on a central functional unit 2, at least one observation system 3 can be arranged which is accommodated by modules—such as, for example, at least an inner one 4 and an external one 5—and can be encapsulated against external influences by a housing-shaped unit 6. This module combination is moreover configured such that the observation system 3, with the whole system being held in an arbitrary position and/or orientation, can be aligned relative to a respective (pre)determinable—for example, horizontal—recording position. As a horizontal reference plane, in this context the plane W which is defined by the respective unit vectors of the coordinate axes X and Z (FIG. 2), with surface normal direction congruent with the gravitational direction G (FIG. 2), is to be used.

Figure 5:
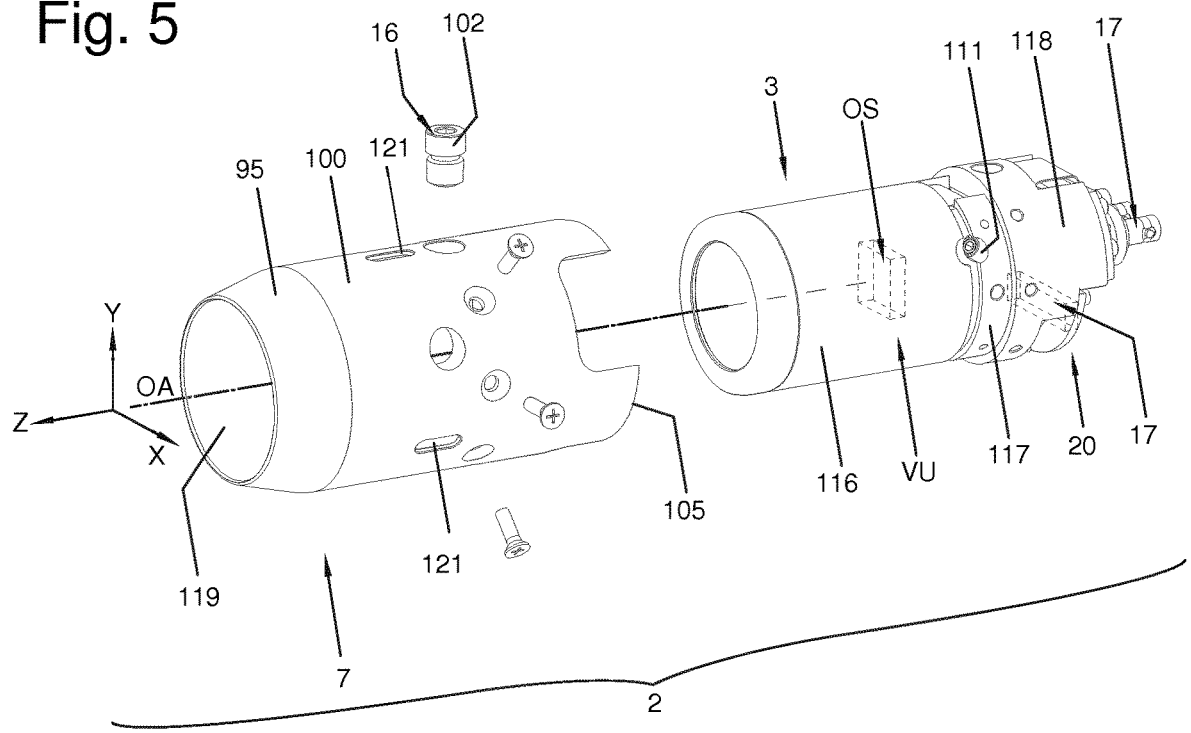
FIG. 5 an exploded view of the central functional unit according to a first embodiment.
Figure 6:
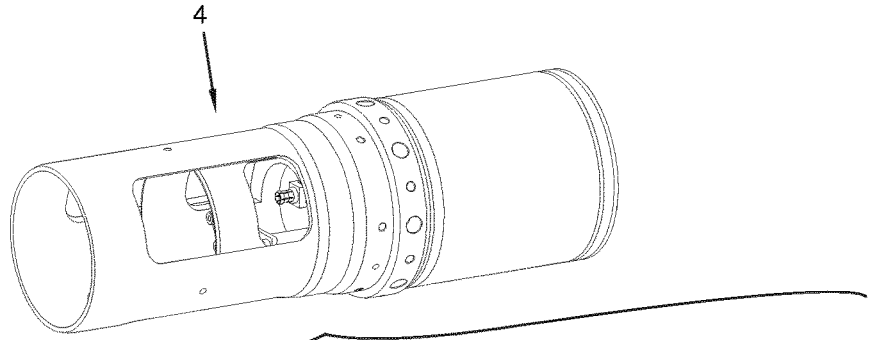
FIG. 6 an exploded illustration of the inner structure module with functional system for correction of slanted positions according to a first embodiment.
Figure 6:
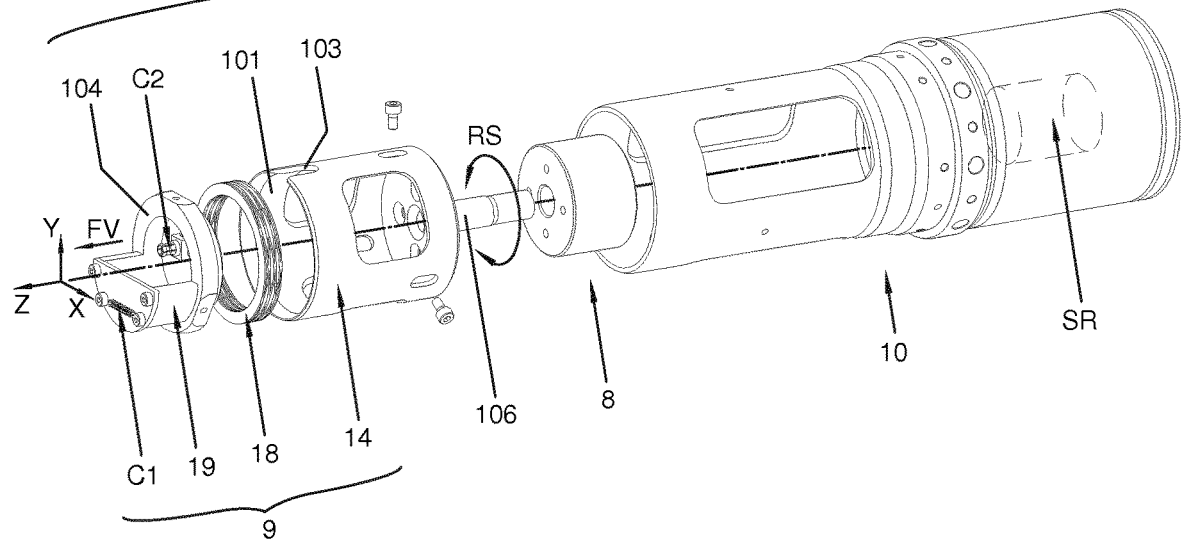

The exploded illustration according to FIG. 5 illustrates that a further division of the central functional unit 2 into further modules—such as at least the observation system 3 and, as needed, at least an interface 7—is provided. By means of an output signal generated by at least one integrated sensor OS, based on the detection of the spatial position and orientation of the whole system 1, an actuating member, identified generally by 8 (FIG. 6), can be activated by at least one system electronics SE (FIG. 1), used for movement of internal functional units and, in this way, a substantially automatic operation can be enabled As illustrated by the exploded illustration of module 4 in FIG. 6, it is provided that the actuator 8, which is acting on a mechanically pretensionable receptacle 9 adaptable to the observation system 3, can be arranged in the region of the inner structure 10.

Figure 7:
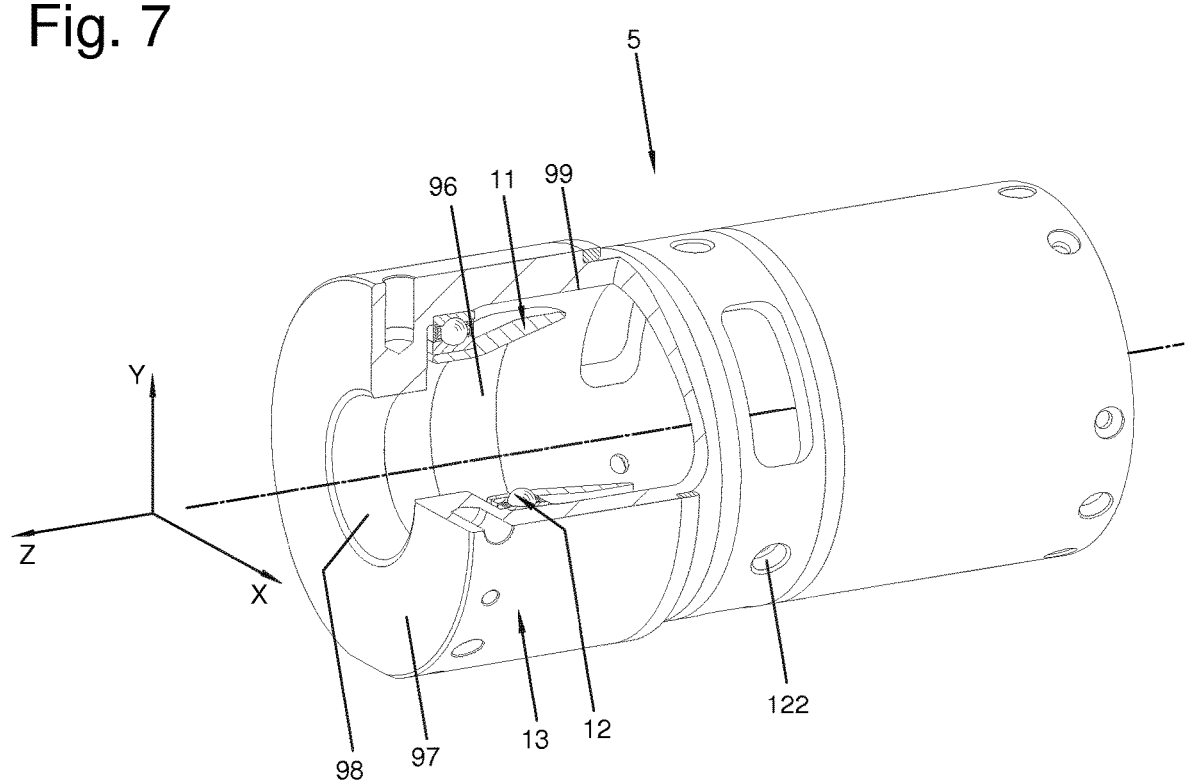
FIG. 7 an isometric partially sectioned illustration of the external structure module according to a first embodiment.

By means of a corresponding advantageous combination with at least one external module 5 according to the partially sectioned illustration in FIG. 7, it can be achieved that the observation system 3, on the one hand, interacts by at least one mechanically rigid connection with the actuator 8 and, on the other hand, with at least one pressure surface 95 of the interface 7 (FIG. 5), by means of a corresponding conformingly embodied counter pressure surface 96 of a stop 11 and at least one bearing element 12, is pretensioned against the connecting flange 13 of the at least one partially surrounding module 5 and, in this way, in the form of the central functional unit 2 forms a part of the whole system that is pivotable at least about the Z axis or optical axis, exactly centered, and guided without play.

Figure 8:
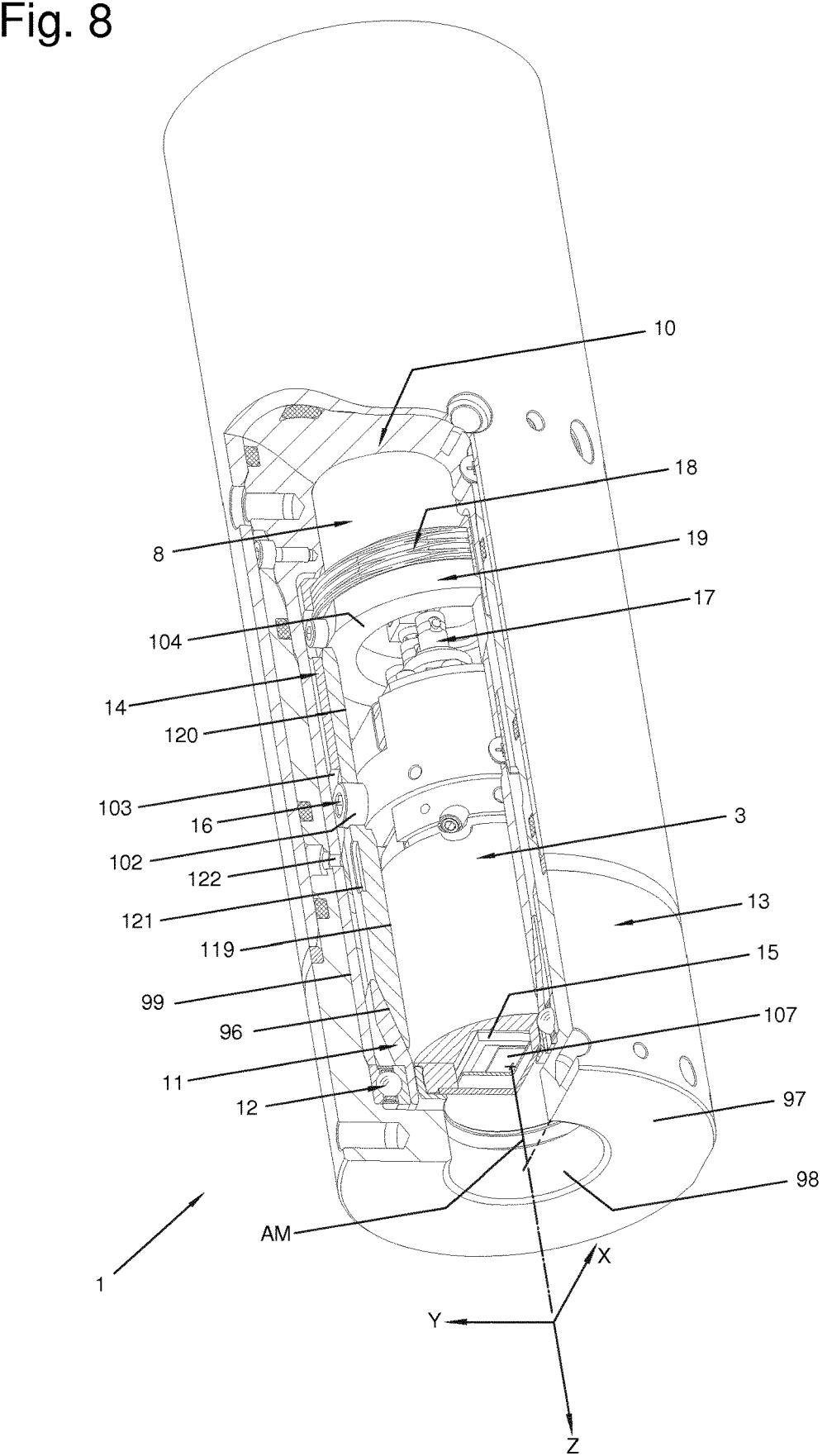
FIG. 8 an isometric view of the whole system according to a first embodiment in the operating state with partially sectioned functional units and module details.

The whole system 1 which is resulting therefrom and is in the operating state is illustrated in an isometric partially sectioned view in FIG. 8. Further important characteristics according to the invention are provided for achieving a highly precise and reliable operation as well as recording of optimal image data and will be described in the following in detail.

Decisive is in this context, in addition to at least the exact adjustability of the flange focal distance, the precise and rigid fastening of an imaging optical system—such as, for example, a lens—which can be arranged according to the invention at a mounting surface 97 in the region of an eye 98. The shape of the connecting flange 13 in this context is provided as an at least one-part envelope structure partially surrounding the central functional unit 12 in such a way that an ideal coaxial guiding action and fastening by an advantageously embodied contact surface 99 with at least housing-shaped structure modules—such as, for example, the inner module 24—can be achieved. It is understood that the configuration of the connecting flange 13 is adaptable to different imaging systems and/or lenses.

It is provided that, by means of an advantageously embodied contact surface 100 of the interface 7, the central functional unit 2 according to FIG. 5 can be accommodated precisely centered as well with precise fit in a correspondingly configured counter surface 101 (FIG. 6) of a carrier 14 of the mechanical receptacle 9. The safe and play-free transmission of the corrective movement carried out by the actuating member 8 to the image recording unit 15 of the observation system 3 is achieved in this context by a substantially conformingly embodied gliding surface 103 (FIG. 6) of the carrier 14 that is interacting with a contact surface 102 of a guiding element 16 that can be fixed in a defined way. At the same time, a safe connection, protected against faulty contacting, of the signal lines embodied through corresponding plug connectors 17 (FIG. 5) at the observation system 3 is produced with corresponding conformingly embodied and positioned contact elements C1 or C2 of the mechanical receptacle 9 for further input or output. In this context, it is also conceivable to build a wireless connection of the signal lines.

In addition, the pretension FV (FIG. 6) induced by a spring element 18 between the housing-type inner structure 10 and the counter pressure surface 96 of the at least partially surrounding structures that is embodied to conformingly correspond to the pressure surface 95 is viewed likewise as substantially important in regard to a precise and play-free corrective adjusting movement. In this context, it is provided to build up this pretension, on the one hand, from the carrier 14 through an actuating member 8 onto the at least one housing-type structure 10 and, on the other hand, by a pressure surface 104 of the electromechanical adapter 19 and a correspondingly embodied pressure surface 105 (FIG. 5) of the interface 7 onto the counter pressure surface 96 of the stop 11, in such a way that the resulting unit of at least the mechanical receptacle 9 and a stop 11 forms a part of the whole system that is precisely adjustable as well as fixed safely against displacement and supported without play and pivotable about the Z axis or optical axis. (variable pivot angle according to arrow RS, FIG. 6).

Due to the drive surface 106 of the carrier 14 interacting with a preferably electromechanical component SR for rotatory signal transmission, it can also be achieved, on the one hand, that all input and output signals are retrievable and operable without limitation even at a pivot angle RS of in particular more than ±360° and, on the other hand, the imaging surface 107 of the image recording unit 15 (FIG. 8), independent of environmental temperature, manufacturing tolerances or other influences, is located in a precisely adjustable constant distance AM relative to the lens mounting surface 97 at all times.

Figure 9:
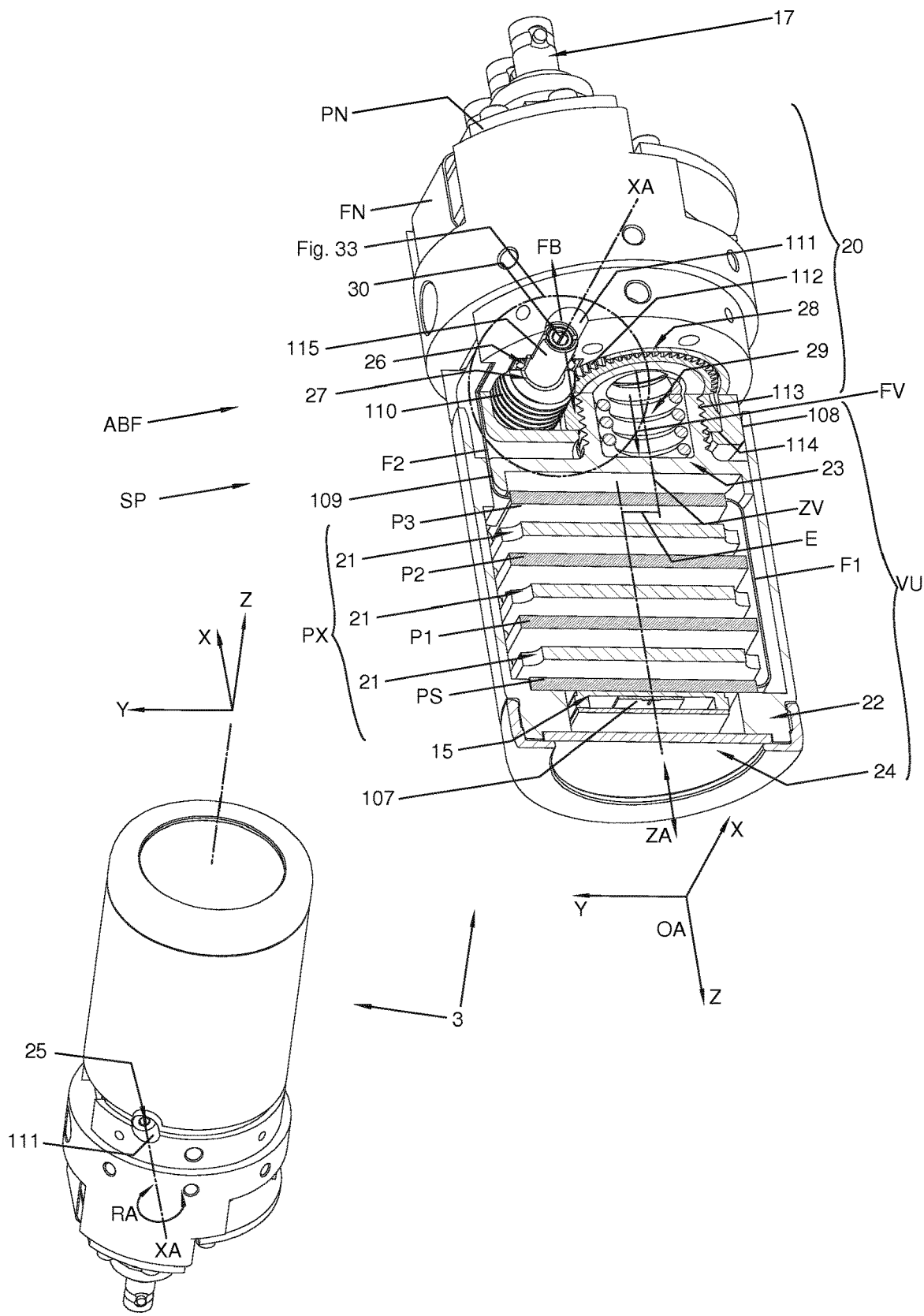
FIG. 9 an isometric partially sectioned illustration of the central functional unit with system for adjusting the flange focal distance according to a first embodiment.

The partially sectioned perspective illustration according to FIG. 9 illustrates that the observation system 3 according to the invention can be provided with at least one functional unit ABF for adjustment of the distance AM in such a way that the imaging surface 107 of the image recording unit 15, which is arranged on at least one side of a rigid circuit board element PS facing the lens mounting surface 97, can be moved relative to at least one additional rigid circuit board element PN arranged in the region of the mechanical base 20 and the mechanical base 20. In this way, the advantages of a singular folded system circuit board with flexible connections F1 to FN and rigid regions P1 to PN can be utilized as well as a universal mechanical adjustability of the flange focal distance AM can be achieved.

In this context, it is provided that the folded circuit board package PX comprising the rigid circuit board elements PS, P1, P2, and P3 is to be guided precisely oriented advantageously with heat-conducting distance elements 21 in an at least partially surrounding envelope geometry 22 and, by means of a pressure plate 23, is to be fixed safely to a rigid observation unit VU whose guiding or movement axis Z, which is exactly congruent with the optical axis OA of the image recording unit 15, interacts at least advantageously with the mechanical base 20 by means of correspondingly embodied guiding surfaces 108. The fastening of the optical elements 24—for example, filters—is provided as well as a safe locking action 109, protected against damaging buckling, of at least one flexible connection F2 of the circuit board package PX with rearward elements FN, PN of the folded system circuit board SP.

Figure 33:
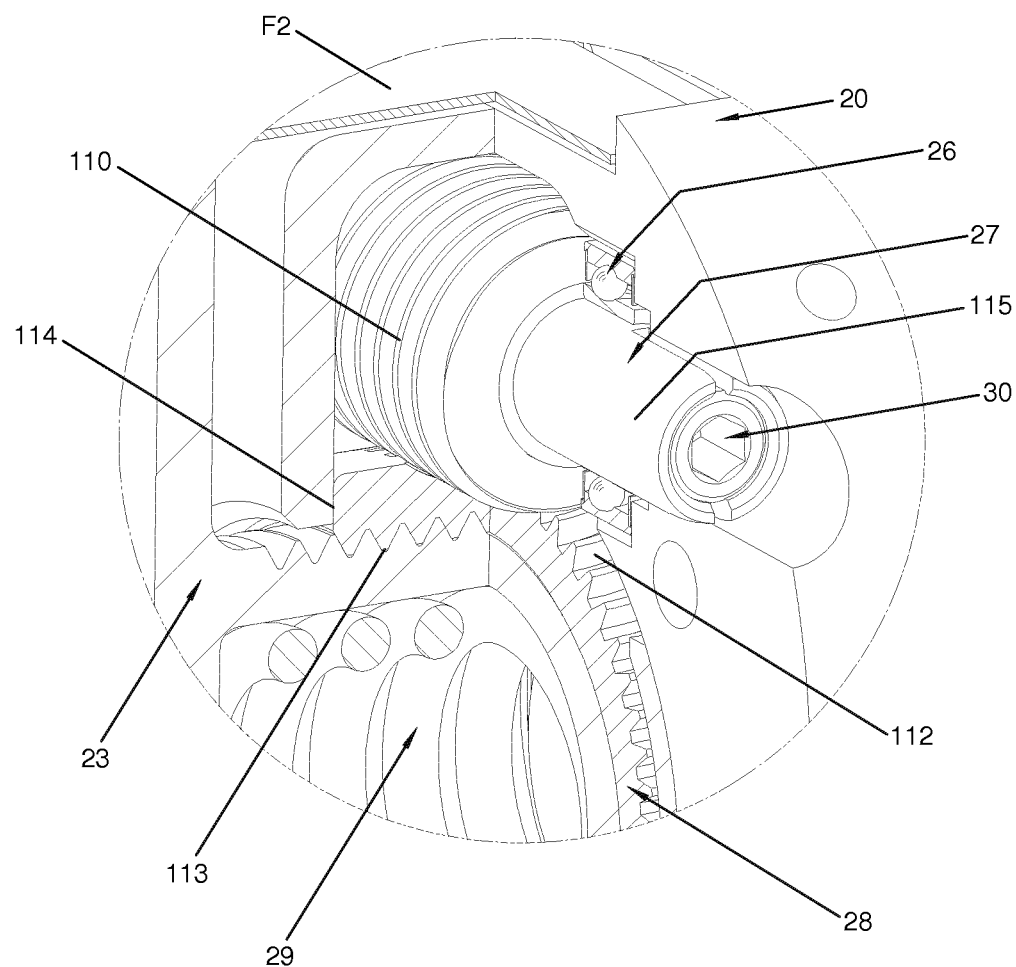
FIG. 33 an isometric partially sectioned detail illustration of the mechanical structure of the manipulator region for adjusting the flange focal distance according to FIG. 9.

According to the invention, it is desired that an adjusting movement RA that is introduced by the user—for example, a rotatory one—by means of the functional unit ABF for adjusting the flange focal distance is transformed into a translatory displacement ZA of the observation unit VU and thus a calibration of the flange focal distance AM can be achieved. It is conceivable in this context to embody the functional unit of actuators acting at a defined distance with friction fit and/or form fit—for example, based on a toothing—in such a way that a tooth geometry 110 (see in particular FIG. 33) transmits a rotation RA, coaxial with the axis XA, of the drive element 27 held by means of bearing elements 26 that is imparted by the user via the manipulator 25, accessible via a correspondingly embodied opening 111, onto a substantially conformingly embodied counter geometry 112 of the adjusting unit 28 supported in the mechanical base 20 and by means of a further friction-fit and/or form-fit connection—such as, for example, a thread 113—is acting on the pressure plate 23 of the observation unit VU and in this way induces a displacement of the imaging surface 107 along the optical axis OA. In this context, it is also conceivable to perform the adjusting movement RA by means of a motor which is integrated into the drive element 27 and to enable an automatable as well as advantageous control in installation situations that are difficult to access.

In addition to a limitation of the freedom of movement of the observation unit VU to at least one translation in Z direction or along the optical axis, for example, by a spatial parallel displacement E of the movement axis ZV of the thread 113 relative to the Z axis or optical axis, the support of the pressure plate 23, pretensioned by the spring element 29 with the force FV, via the adjusting unit 28 against a correspondingly embodied stop 114 of the mechanical base 20 is likewise important for compensation of tolerances, vibrations, thermal expansion or the like.

For fixation of the adjusted distance AM, it is provided to embody the friction-fit and/or form-fit connection of the drive element 27 and of the adjusting unit 28 advantageously in such a way that at least an inherent self-locking action is achieved. Moreover, an additional locking action of the functional unit ABF for adjusting the flange focal distance by means of a corresponding geometric configuration can be achieved which, in the simplest embodiment, comprises a slotted shape 115 contacting conformingly at least partially the access opening 111, which is expanded by pushing in a securing element 30 and thus exerts radially blocking forces FB on the opening 111 acting as a counter pressure surface.

In the context of the modular system structure according to the invention, it is also provided as important to connect the observation system 3 with the interface 7 rigidly to a central functional unit 2 for integration into the whole system, as illustrated in the exploded illustration according to FIG. 5. In this context, it is conceivable that the interface 7 comprises at least one surrounding geometry 119 or 120 (FIG. 5 or FIG. 8), which is embodied substantially conformingly to the external contour 116 to 118 of the base 20 embodied as guiding and mounting surface and which serves for supporting the mechanical guiding action and adjusting movement of the observation unit VU on the optical axis OA as well as enables a precisely oriented and centered mounting.

Moreover, it is provided that in the region of the external wall of the interface 7 at least one functional surface 121 can be arranged which by means of a corresponding securing element—for example, a screw (not illustrated)—can be used through an opening 122 (FIG. 8) for a permanent locking action against surrounding structures, as needed.

In this context, it is conceivable to substitute the functional properties of the interface 7 by corresponding inherent design characteristics of the external geometry of the observation system 3 and/or of further at least partially surrounding envelope structures and envelope modules so that the observation system, without additional adapter elements or interface elements, can be accommodated advantageously in a guided fashion as well as, without play and rigidly, can be fixed with at least one pivotable part of the whole system which is driven by an actuating member 8.

It is understood that the functional unit ABF for adjusting the flange focal distance can act, freely selectably positioned, on at least each rigid region PS to PN of substantially arbitrarily folded circuit board packages and thus, by a system-wide integration capability, the maximum flexibility and modularity in the configuration of the whole system can be achieved. Moreover, it is also understood that the functional unit ABF for adjusting the flange focal distance can be optimally integrated and utilized also in embodiments of at least electronic system components without flexible connections F1 to FN.

Figure 10:
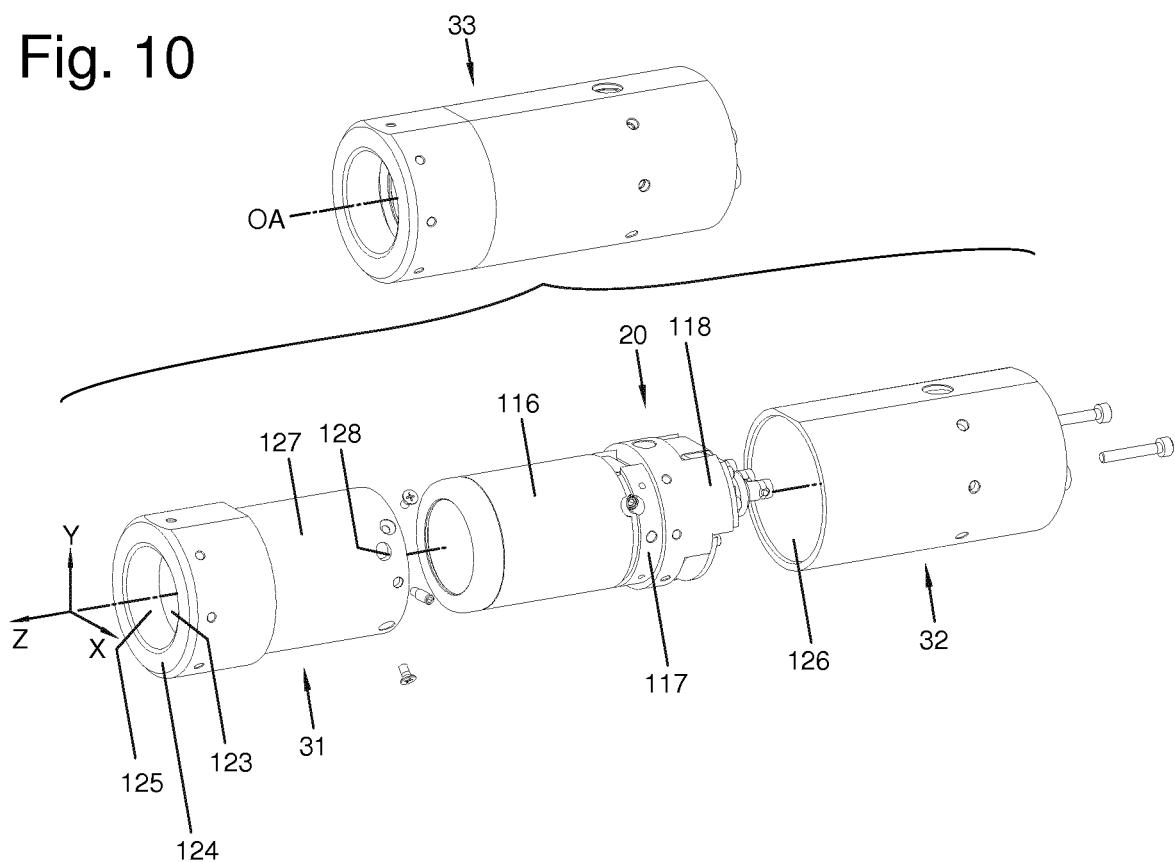
FIG. 10 an exploded illustration of an alternative selection and composition of functional modules to a new observation system without correction of slanted positions.

In regard to the functional optimization capability of the whole system to respective different application situations, it is also provided in accordance with the invention that the observation system 3 can be used also without (electro) mechanical correction unit for stabilization of the image section and image orientation and can be arranged with at least one adaptable interface element 31 for mounting an optical imaging device and at least one external envelope structure 32 to an observation system 33 according to the illustration of FIG. 10.

In this context, it is provided that the interface element 31 comprises in analogy a surrounding inner geometry 123 which is embodied substantially in conformity with the external guiding and mounting surfaces 116 to 118 and which enables a precisely oriented and centered mounting in the region of the base 20 as well as the mechanical guiding and adjusting displacement ZA of the observation unit VU along the optical axis OA.

It is understood that, as a result of an embodiment of the interface element 31 that is structure-deep integrated into the whole system and adaptable at least to different imaging systems and lenses, a safely and easily performable adaptation of the observation system to respective applications is enabled. According to the invention, it is provided in this context that the lens is reliably fixed at a mounting surface 124 in the region of an eye 125.

Even though the combination of an adaptable interface element 31 with the observation system 3 provides already a system with full functional range of an observation device, an additional protection of the whole system, as needed, against external influences can be achieved by the arrangement of a substantially arbitrary envelope structure 32. For this purpose, it is provided that in particular at least the inner geometry 126 of the envelope structure 32 is embodied such that the guiding and mounting surfaces 116 to 118 as well as the external shape 127 of the interface element 31 are at least oriented coaxially in the same direction and centered and, in this way, an additional optimization of the rigidity and guiding precision is achieved. Moreover, an additional protection against accidental displacement of the manipulator 25, accessible through a correspondingly embodied opening 128, of the drive element 27 for calibration of the flange focal distance AM can be achieved in this way.

Figure 11:
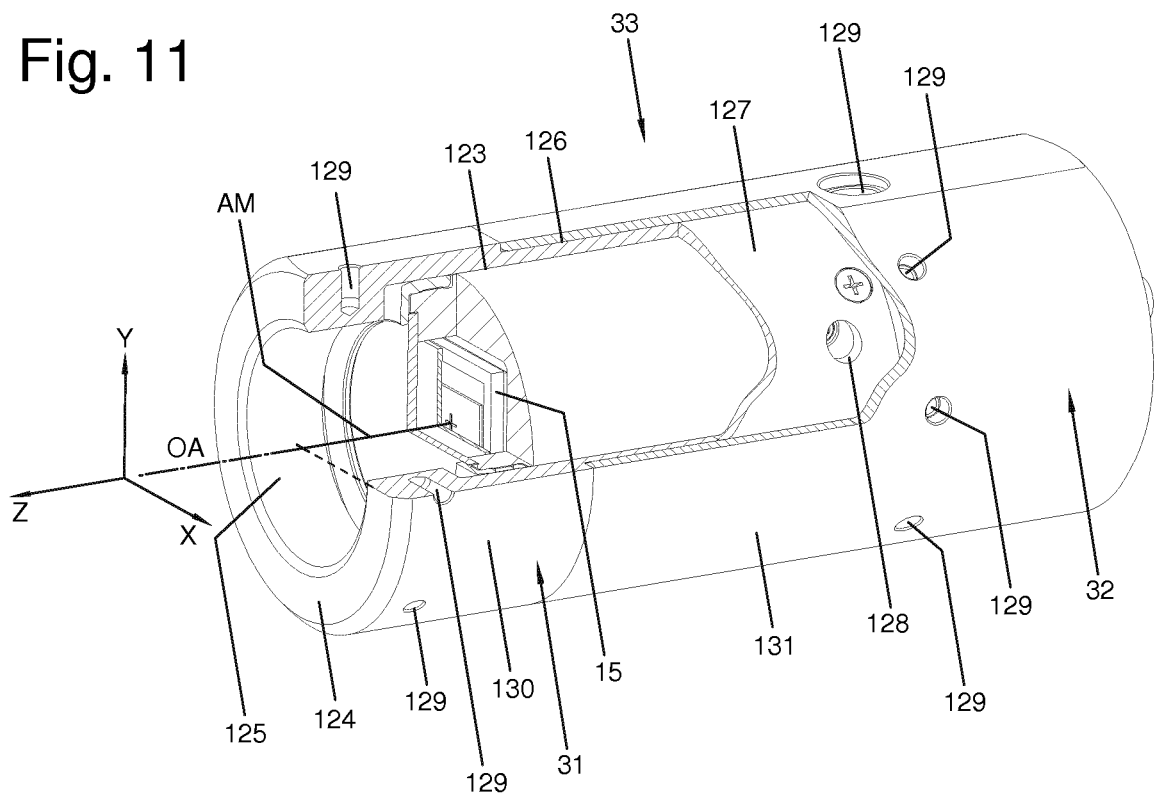
FIG. 11 an isometric view of the alternative observation system in the operating state with partially sectioned functional unit and module details.

The thus resulting operation system 33 which is in operating state is illustrated in an isometric partially sectioned view in FIG. 11. It should be emphasized as important that a substantially arbitrary adaptability with simultaneous retention of the full functional range is enabled due to the illustrated combination of modules.

The configuration of the at least mechanical structures in the housing-shaped region is additionally embodied such that, for example, mounting geometries 129 are provided, on the one hand, for attachment of the whole system to a carrier system in a substantially arbitrary orientation and, on the other hand, for connection of external components, devices, sensors or like attachment parts. Conceivable is also that they alternatively can be embodied as bayonet mount, thread surface or plug surface. Mounting of the whole system on a carrier system in any orientation can also be achieved by carrying elements (not illustrated) which engage with friction fit and/or form fit at the external envelope geometry 130 or 131.

Second Embodiment

Figure 12:
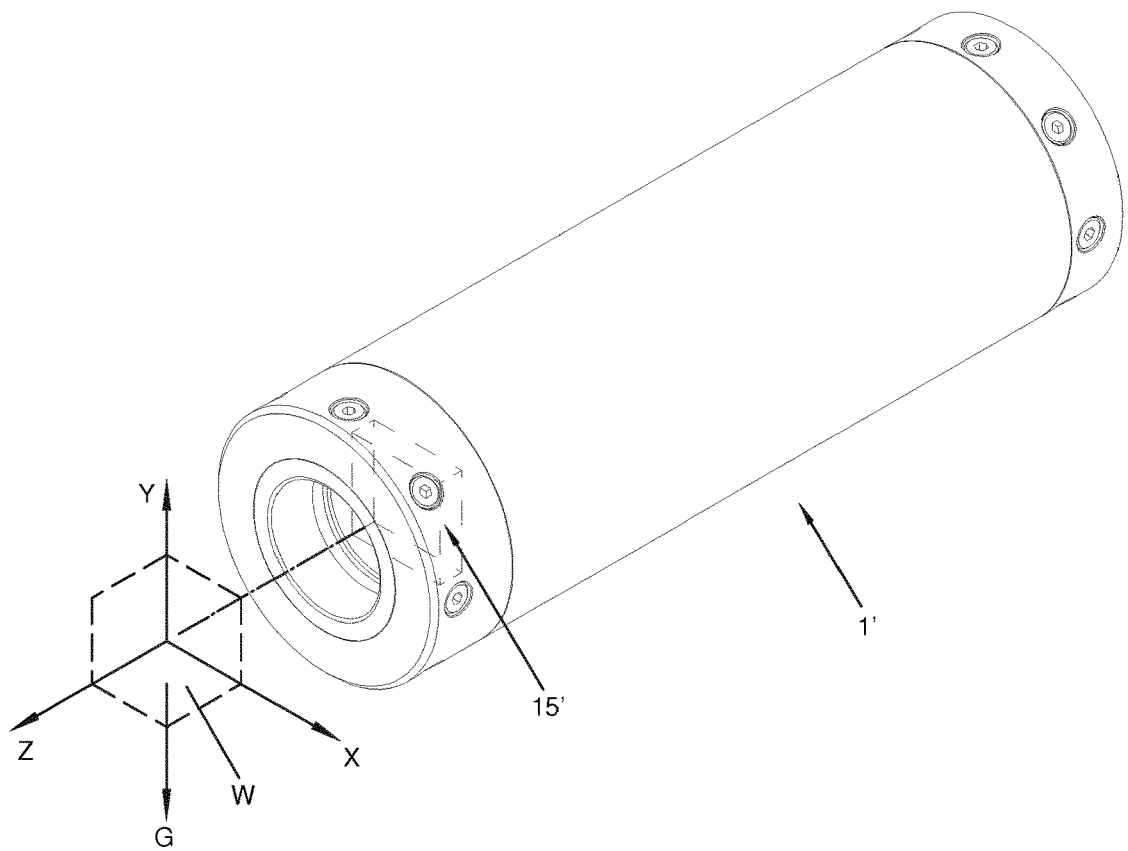
FIG. 12 an isometric front view of the whole system according to a second embodiment in the operating state.
Figure 13:
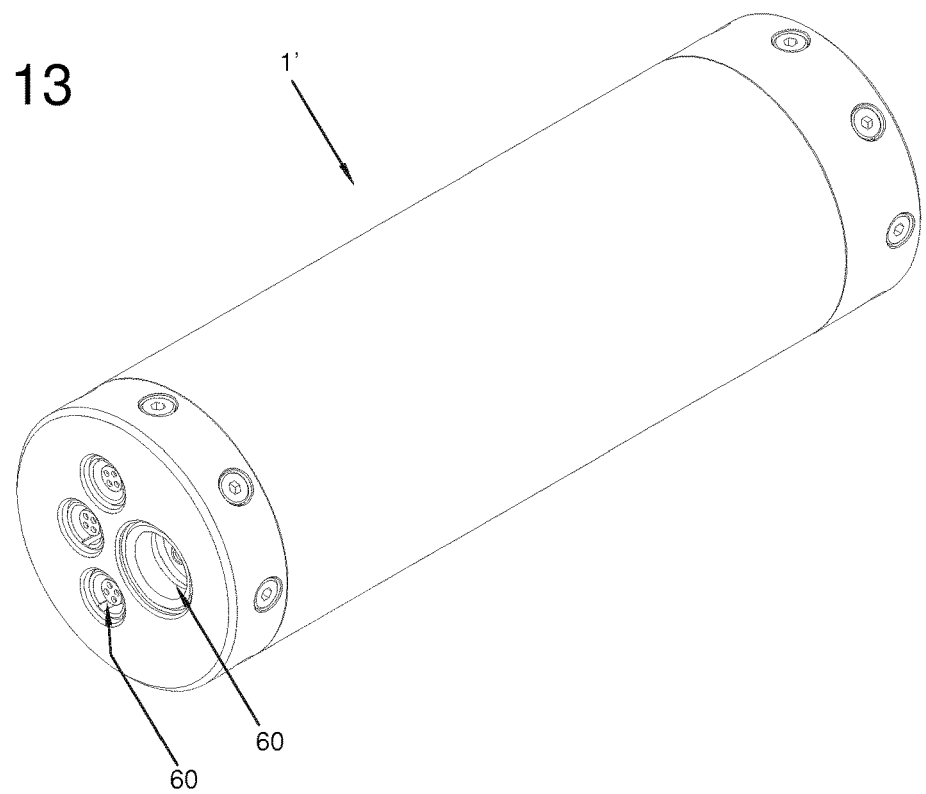
FIG. 13 an isometric rear view of the whole system according to a second embodiment in the operating state.

In combination with the functional structure according to FIG. 1, the two isometric perspective illustrations according to FIGS. 12 and 13 in the form of a respective isometric front view and rear view of the whole system 1' represent a possible further embodiment of the concept of the invention.

Figure 14:
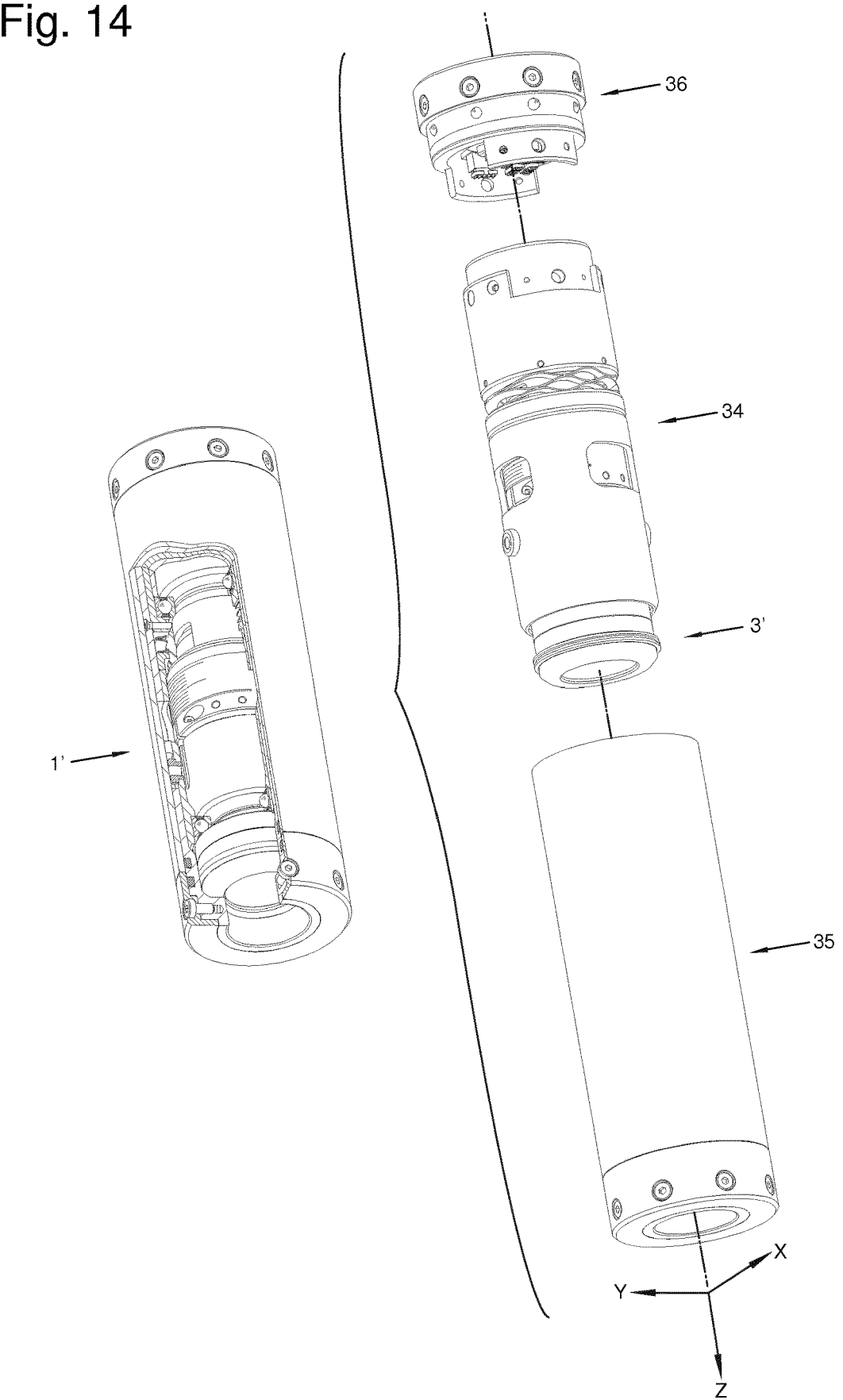
FIG. 14 an exploded illustration of the system structure according to a second embodiment.

The realization in this context is provided also in regard to an optimizable functional unit with respect to different application situations which also comprises a flexible system structure according to FIG. 14 in such a way that based on a central functional unit 34, on the one hand, at least one observation system 3' with an image recording unit 15' can be arranged and, on the other hand, this unit can be combined with at least one external structure module 35 and at least one interface unit 36. This functional unit is moreover configured such that the image recording unit 15', while the whole system is held in arbitrary position and/or orientation, can be aligned relative to a respective horizontal recording position. As a horizontal reference plane, in this context the plane W which is defined by the respective unit vectors of the coordinate axes X and Z, with surface normal direction congruent with the gravitational direction G (FIG. 12), is to be used also.

Figure 15:
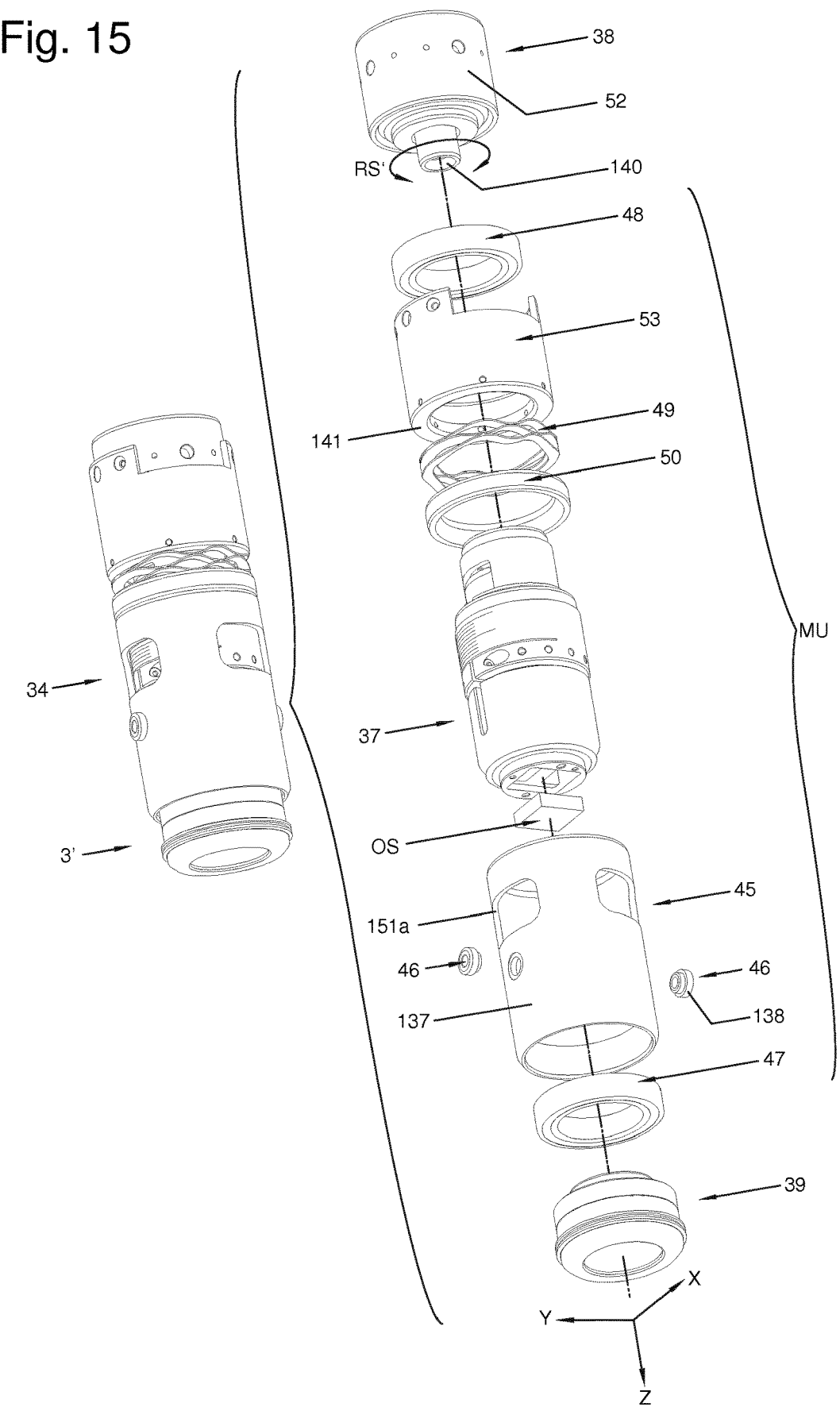
FIG. 15 an exploded illustration of the central functional unit according to a second embodiment.

The exploded illustration according to FIG. 15 illustrates that for effective use of the observation system 3' a further division of the central functional unit 34 into further modules is provided so that the substantially automatic operation at least in the region of a control unit 37 is possible. In simplest embodiment, it is conceivable in this context that for this purpose a sensor OS for detecting the spatial position and orientation of the whole system can be integrated. By means of an output signal generated by this sensor, by at least one system electronics SE (FIG. 1) an actuating member, generally identified by 38, can be activated and utilized for operation of the component groups in the region of the central functional unit 34. Moreover, it is provided that the image recording unit 15' of the observation system advantageously can be arranged in the region of a head component group 39 which, on the one hand, by means of at least one rigid connection interacts with the actuating member 38 and, on the other hand, is precisely supported by means of at least one pretensioned and play-free mechanical unit MU. This illustrates that at least the head component group 39 as a whole forms a part of the central functional unit 34 which is pivotable at least about the Z axis or optical axis (variable pivot angle according to arrow RS', FIG. 15). In this context, the pivot angle RS' can also in particular amount to more than ±360°.

Figure 17:
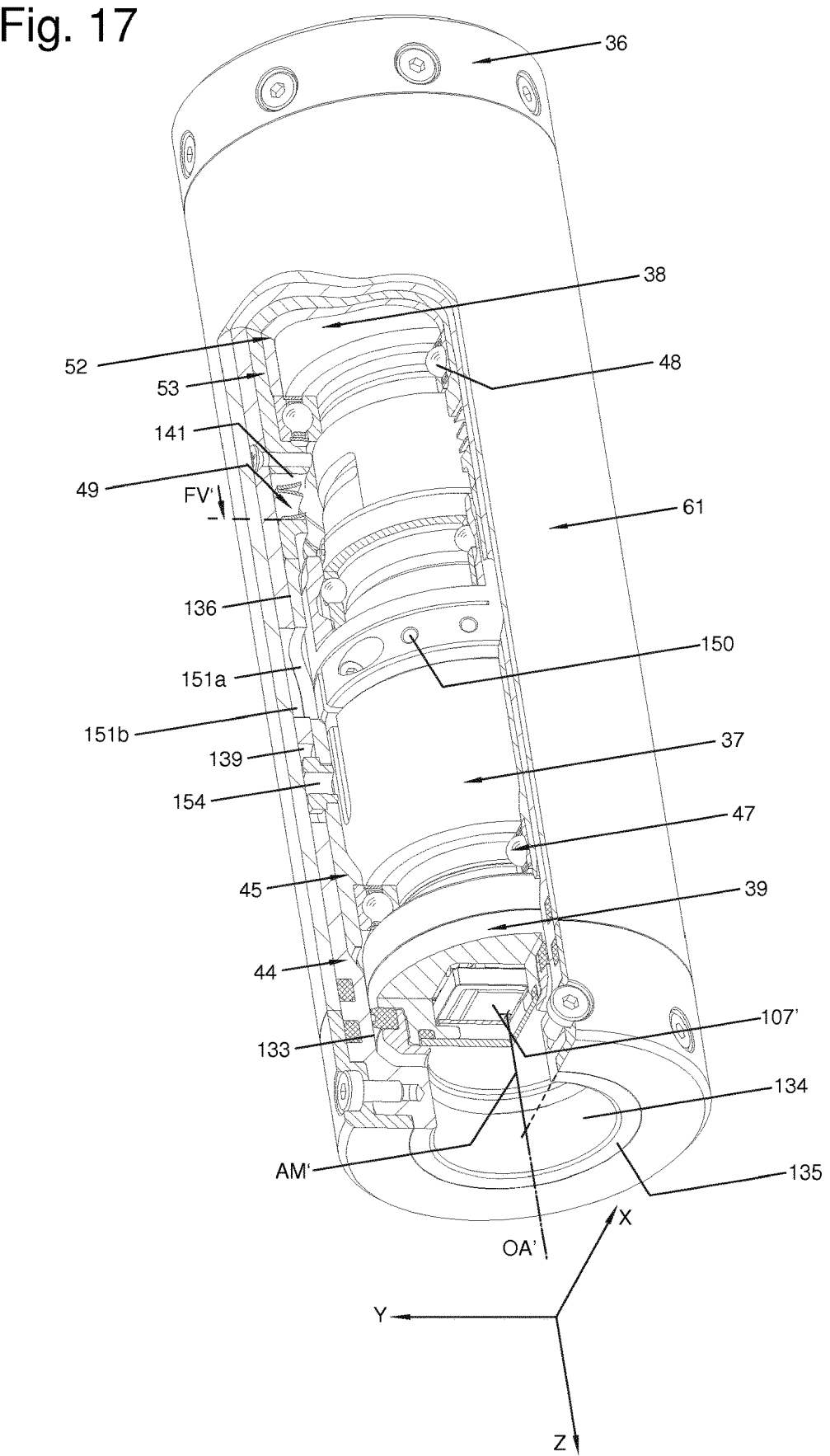
FIG. 17 in isometric view of the whole system according to a second embodiment in operating state with partially sectioned functional units and module details.

For ensuring a highly precise and reliable operation as well as the effective recording of optimal image data, characteristics according to the invention are provided whose at least basic embodiments are illustrated in FIG. 17 in a partially sectioned whole system 1' in operating state and which will be described in the following in detail.

Figure 16:
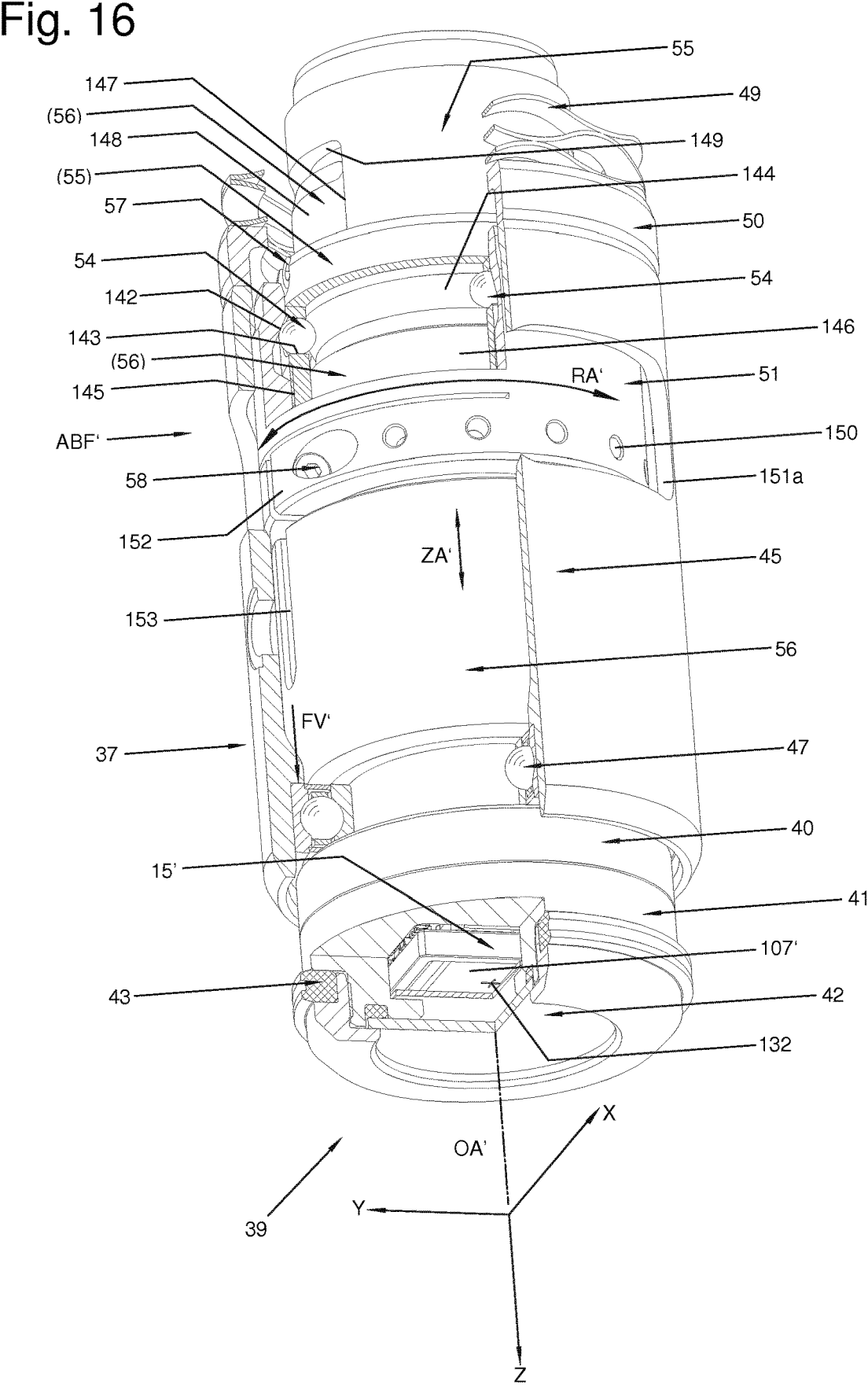
FIG. 16 an isometric partially sectioned illustration of the central functional unit according to a second embodiment.

According to FIG. 16, the configuration of the head component group 39 is provided such that the image recording unit 15' can be exactly fixed by means of a counter plate 41 that is substantially conforming to the base plate 40 in such a way that the surface normal of the imaging surface 107' at the center 132 (optical axis OA') is coaxial to the unit vector of the axis Z. For adaptation to specific application scenarios, in the optical beam path prior to impinging on the imaging surface 107' at least one substantially arbitrary optical element 42 can be arranged. For protecting the whole system 1' against external influences in general and the central functional unit 34 in particular against contamination, at least one sealing element 43 can be arranged which is acting against a corresponding contact surface 133 of an at least partially surrounding external structure 44 (FIG. 17 or FIG. 19) and is embodied in form and function such that all functions of the whole system remain unimpaired for full sealing action.

For ensuring an optimal imaging quality of the recorded images, an advantageous combination of functional units is provided so that inter alia the distance and the position of the imaging surface 107' relative to the mounting surface of the imaging optical system—for example, a lens—can be exactly adjusted and maintained. According to the invention, this lens can be released in the region of an eye 134 and fixed at a corresponding correlated mounting surface 135. The shape of the external structure 44 is also conceivable as an envelope structure which at least partially surrounds the central functional unit 34 such that an adaptability to different imaging systems and/or lenses is enabled, in addition to a coaxial guiding action and support of the internal pretensioned mechanical unit MU with the optical axis OA' that is achievable by an advantageously embodied running surface 136 (FIG. 17).

Also, it is provided that, in the region of a bearing element 45 which is advantageously guided against a correspondingly embodied contact surface 137 (FIG. 15), at least one fixation element 46 can be arranged whose external surface 138, on the one hand, by being guided in a correspondingly shaped counter surface 139 (FIG. 17) of at least the external structure 44, reduces the freedom of movement to a translation in Z direction or along the optical axis and reduces the susceptibility to vibrations and can increase the service life.

For configuration of a vibration-compensating and play-compensating intelligent mechanical structure, a pretensioned support according to FIG. 15 is also important wherein, based on the control unit 37, in general in the regions of the provided bearing elements 47 and 48, the compact head component group 39, on the one hand, and the actuating member 38, on the other hand, can be connected and supported by means of a drive surface 140 which is preferably interacting with an electromechanical component SR (FIG. 1) for rotatory signal transmission in such a way that at least the movement axis of the resulting central functional unit 34 is congruent with the optical axis Z and, in this way, any number of revolutions can be performed. The pretension is induced on a manipulator 51 (FIG. 16) according to FIG. 15 based on a spring element 49 by means of advantageously guided elements 45 and 50.

The stop element 53 which can be arranged in the region of the stator 52 (FIG. 17 or FIG. 15) is embodied in this context such that a bearing element 48 can be accommodated as well as that the geometric embodiment, illustrated in the form of the surface 141, serves as a counter pressure surface for the spring element 49 inducing the pretension FV'. Also, it is provided that the stop element 53 can be connected without play and rigidly with surrounding housing-shaped structures and the amount of pretension can be adjusted, for example, by a guided element 50.

The partially sectioned perspective illustration according to FIG. 16 and FIG. 17 illustrates that, for adjusting the distance AM' according to the invention, a functional unit ABF' for adjusting the flange focal distance is provided in such a way that under the action of the pretension FV' an adjusting movement of the manipulator 51—for example, a rotation RA'—introduced by the user induces by a pressure surface 144 respective movements of actuators 54—for example, balls—oriented at least in radial direction perpendicularly to the optical axis which, by a contact surface 143 of an axially precisely movably guided support structure 55 act on a correspondingly embodied counter surface 144 of a carrier unit 56 rigidly connected at least to the image recording unit 15' and, based on an at least one friction-fit and/or form-fit connection—for example, in the form of a thread connection 145—of the manipulator 51 to the support structure 55 can be transformed into a translation, induced by the bearing element 48, of the imaging surface 107' in the direction ZA' relative to the object mounting surface 135 and the flange focal distance AM' can thus be precisely adjusted.

For assisting in an optimal function, it is additionally provided in this context that the components 55 and 56 which are movable relative to each other interact by a corresponding guiding surface 146 as well as at least an axial guide 147 of a geometric configuration—for example, in the form of a guiding pin 148 of the carrier unit 56—which is limited to the Z direction or along the optical axis and which is guided in a substantially conforming groove 149 of the movable support structure 55. An adjustment and/or limitation of the adjusting travel is conceivable by fixation of an end stop element 57.

The structural configuration of the whole system makes it also possible to arrange, substantially arbitrarily positioned, the functional unit ABF' for adjusting the flange focal distance internally in the system, for example, in the region of the at least partially surrounding external structure module 35, such that an additional protection against external influences, blockages or undesirable displacement can be achieved. In this way, additionally the maximal flexibility and modularity in the configuration of the whole system is ensured.

Moreover, it is conceivable that the manipulator 51 comprises functional surfaces 150 which, through corresponding openings 151a and 151b of the surrounding components, can be accessed and enable a rotation of the manipulator 51, optionally by means of corresponding operating tools (not illustrated). By means of a corresponding geometric configuration 152, a fixation of the adjusted distance AM' can be achieved which, in the simplest embodiment, has a shape surrounding the guiding surface 146 at least partially and which, by tightening a securing element 58, is contracted and thus exerts a blocking action on the guiding surface 146.

Likewise, it is conceivable that in the region of the functional unit ABF' for adjusting the flange focal distance at least one functional surface 153 is embodied which is provided, on the one hand, for fixation of the carrier unit 56 through an opening 154 against the external at least partially surrounding structure 44 during the rotatory adjusting movement of the manipulator 51 and, on the other hand, can be utilized also for permanent locking of the mechanical unit, as needed.

Figure 18:
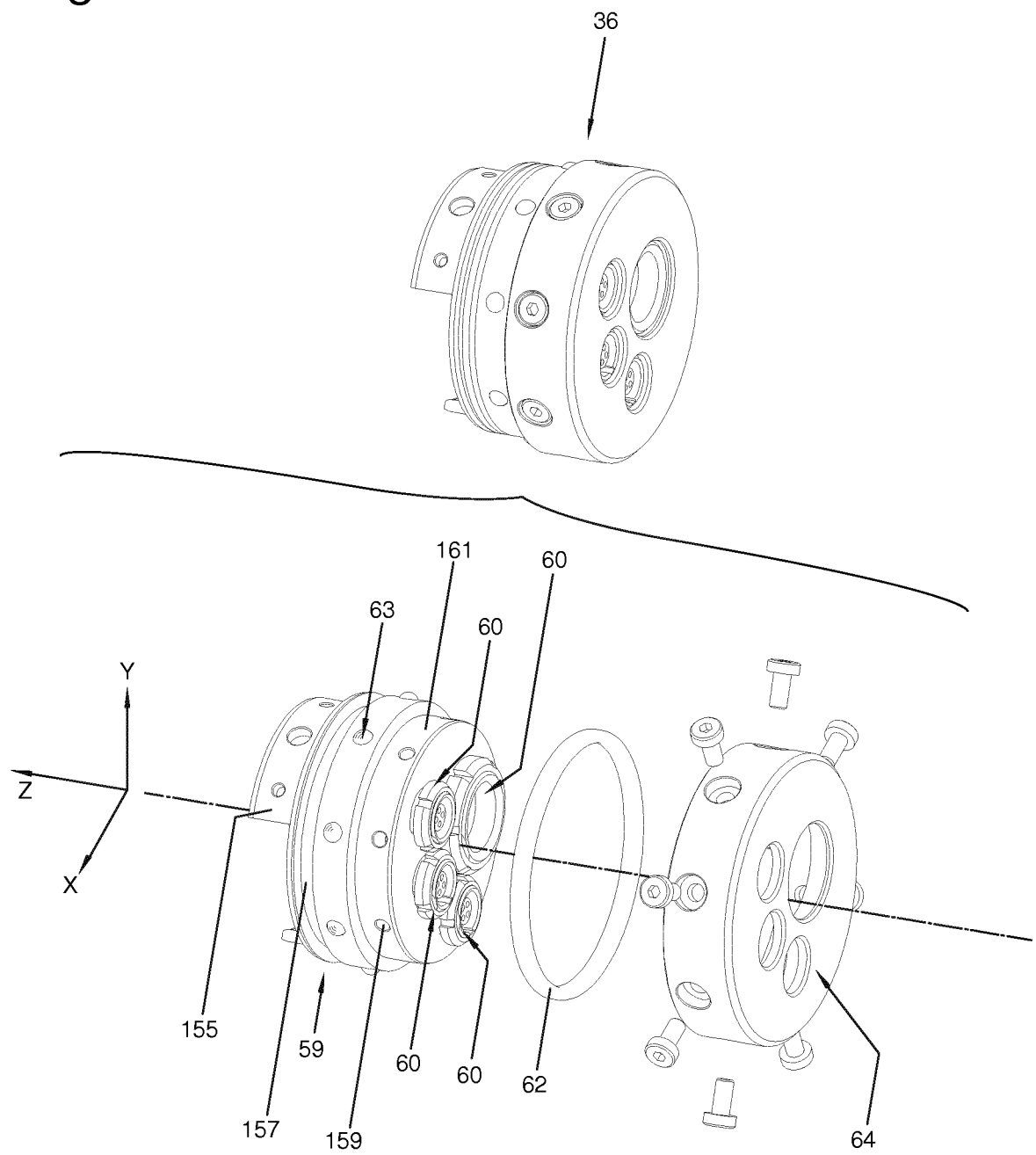
FIG. 18 an exploded illustration of the interface module according to a second embodiment.

The construction of the interface unit 36 is embodied according to FIG. 18 such that, in the region of a base 59, interfaces 60 that can be arranged at least substantially arbitrarily but in advantageous embodiment however protected respectively from external influences and media, signals and information of the internally and externally connected functional units of the whole system for further processing with additional devices can be output as well as user commands can be inputted. The base 59 comprises in this context also a corresponding shape 155 with which a rigid friction-fit and/or form-fit connection with surrounding structures or functional units can be produced.

It is understood that for protection of the whole system from external influences and media, sealing elements 62 are provided at least in the region of the housing-shaped component groups that act likewise, on the one hand, against corresponding conforming grooves 156 and 157 (FIG. 18 or FIG. 19) and, on the other hand, against contact surfaces of at least one exchangeable envelope element 61 protecting against external influences.

Figure 19:
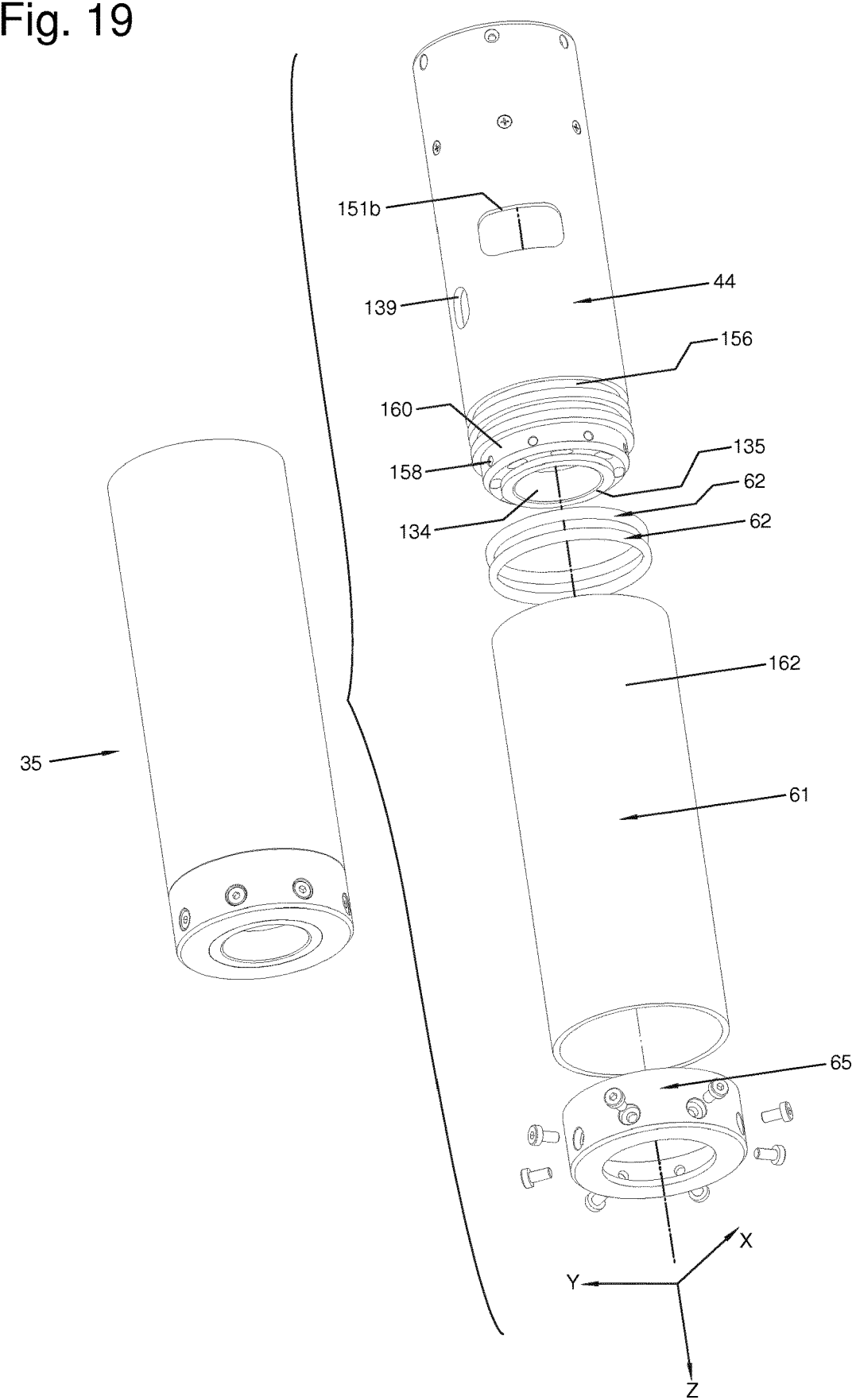
FIG. 19 an exploded illustration of the external structure module according to a second embodiment.

The configuration of at least the mechanical structures in the housing-shaped region is additionally embodied such that, on the one hand, for attachment of the whole system on a carrier system in a substantially arbitrary orientation and, on the other hand, for connection of external components, devices, sensors or like attachment parts, aside from the fastening locations 158 and 159 illustrated in the views according to FIG. 18 and FIG. 19, carrier elements (not illustrated) are provided engaging by means of respective functional surfaces, generally identified at 160 and 161, as well as engaging the external envelope geometry 162 with friction fit and/or form fit. Conceivable is also that these mounting surfaces alternatively are embodied as bayonet mount, thread surface or plug surface. For optimal fastening of the carrier elements or securing against rotation, as needed, the envelope element 61 can be attached by means of at least corresponding locking elements, for example, balls 63.

For the protection, on the one hand, of the functional surfaces 160 and 161 that are useable as mounting surfaces and, on the other hand, for the fixation of at least the envelope element 61, the at least partially covering elements 64 or 65 (FIG. 18 or FIG. 19) are provided.

In regard to the functional optimization capability of the whole system to respective different application situations, it is provided according to the invention in analogy to the first embodiment that essentially arbitrary functional units, even without (electro)mechanical correction unit for stabilization of the image section and image position, can be combined and alternatively connected with at least one element for mounting an optical imaging device and at least one external envelope structure to an observation device (in analogy to FIG. 10).

Further characteristics that are adaptable or usable for both embodiments in accordance with the invention will be described in detail in the following based on the second embodiment.

Figure 20:
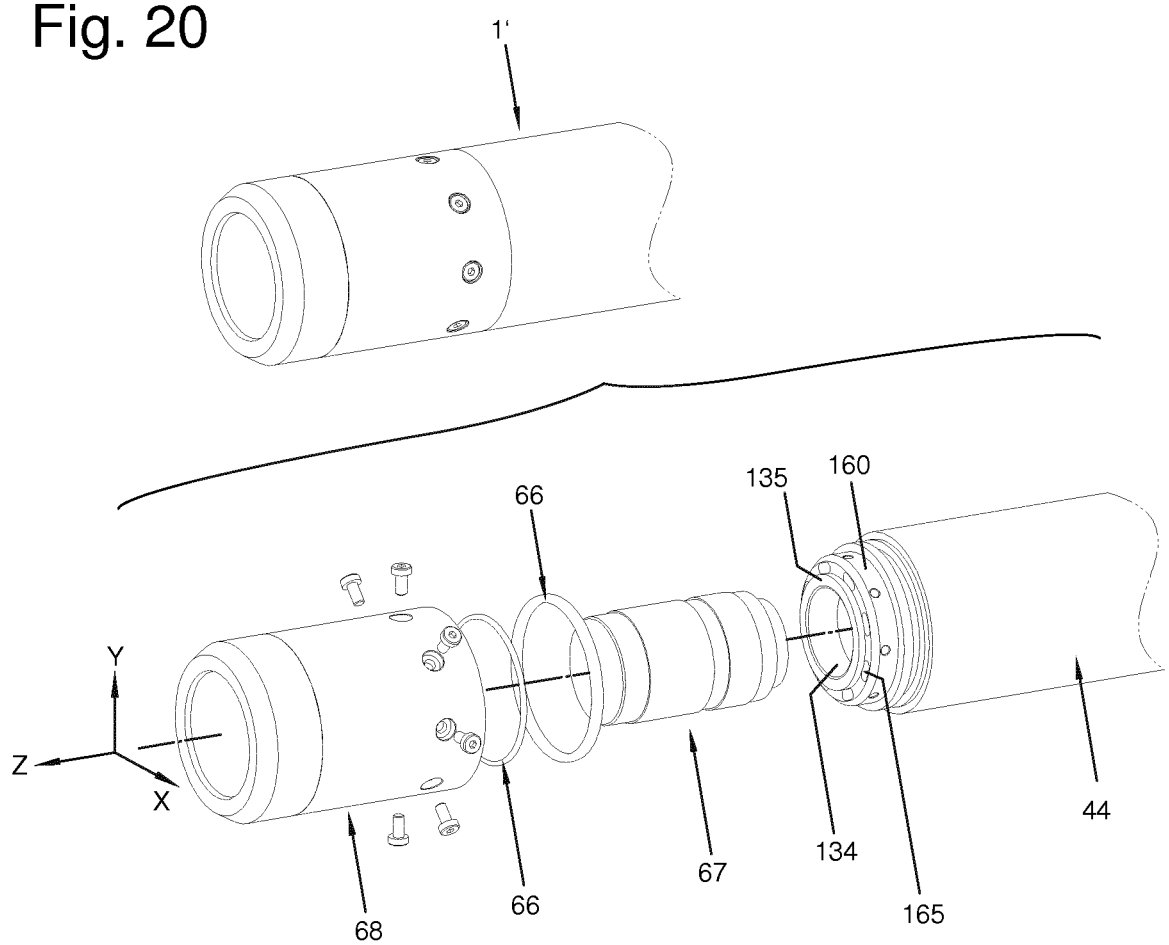
FIG. 20 an exploded illustration of the structure of a possible actuating module for control of a lens.

According to the exploded illustration of FIG. 20, it can be seen that it is conceivable to provide the external envelope geometry of the housing-shaped elements or units with at least one functional surface 160 which can be correlated with the mounting of substantially arbitrary additional modules. By arranging corresponding sealing elements 66, a complete protection against external influences of the whole system expanded by means of an external module can be achieved.

The exploded illustration according to FIG. 20 also illustrates a conceivable expansion with a module for control of at least the actuating systems of a substantially arbitrary lens 67. For this purpose, it is provided to embody the configuration of the module as a functional unit 68 that surrounds a lens 67 fastened to the mounting surface 135 at least partially and shields it against undesirable displacement and can be arranged in the region of the functional surface 160.

Figure 21:
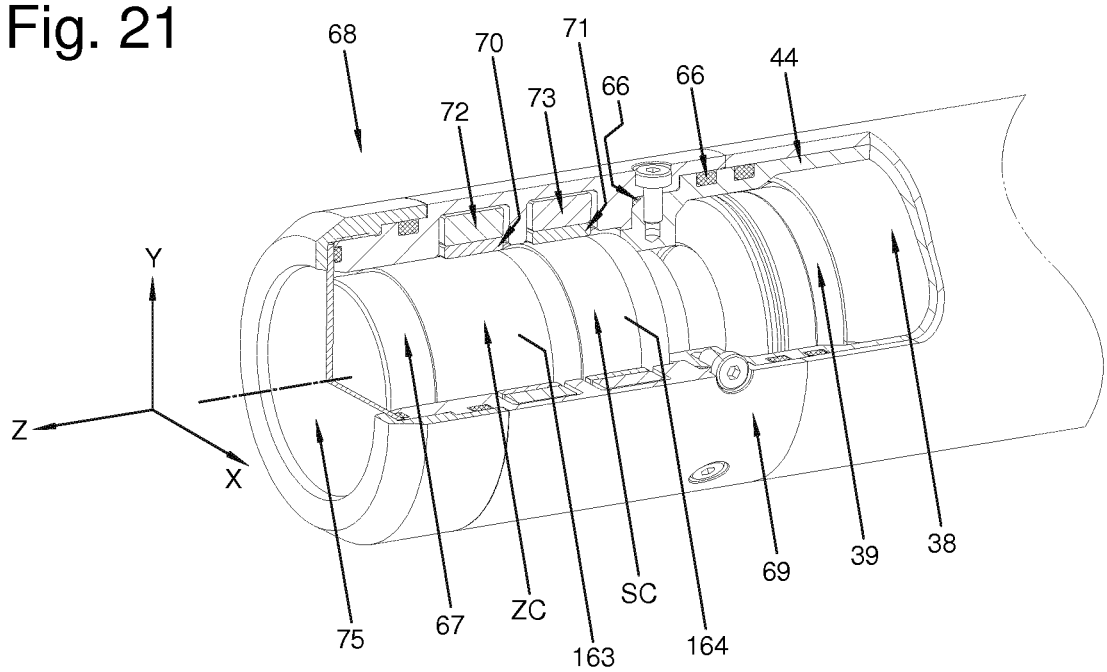
FIG. 21 an isometric partially sectioned illustration of the actuating module for controlling the lens according to FIG. 20.

The at least partially surrounding housing-type envelope geometry 69 of the functional unit 68 illustrated in FIG. 21 can substantially be embodied in this context such that at least one actuating unit 72 or 73 can be arranged which is correspondingly correlated with the lens-side units for adjusting the recording parameters—in particular for control of the image section ZC and for regulating the image sharpness SC—and by means of at least one adapter element 70 or 71 is acting on a correlating control member of the lens and is supported at least against a region of the housing-type envelope geometry 69. In this context, it is conceivable to embody the surrounding envelope geometry 69 as a functional unit that, during the operation of the control members ZC and SC, automatically adapts in size and shape to the employed lens 67 so that lenses with static as well as dynamic external envelope geometry—for example, on the basis of an inner or external focusing action—can be operated.

In addition, it is conceivable to embody the adapter elements 70 and 71, on the one hand, as functional elements that are adaptable at least in external shape to the geometric configuration of the external action surfaces 163 or 164 of the lens-side control members ZC or SC and, on the other hand, to directly embody a control by a correspondingly embodied counter tooth geometry of the respective correlated actuating units 72 or 73 in case of a mechanically inherently usable embodied surface of the external action surfaces 163 and 164—for example, a toothing. For additional protection of the lens, an optical element 75 can be arranged in the simplest embodiment.

In analogy, additional actuating members are conceivable such as, for example, an actuating member 74 which is correlated with the lens-side unit IC for control of the aperture or brightness. It is provided to enable also connection and control of additional externally mounted component elements at least to the system electronics SE (FIG. 1) by means of corresponding openings 165 (FIG. 20) in addition to the adjusting units 72 to 74 and substantially arbitrary functional units that are integrated into the lens 67.

Figure 22:
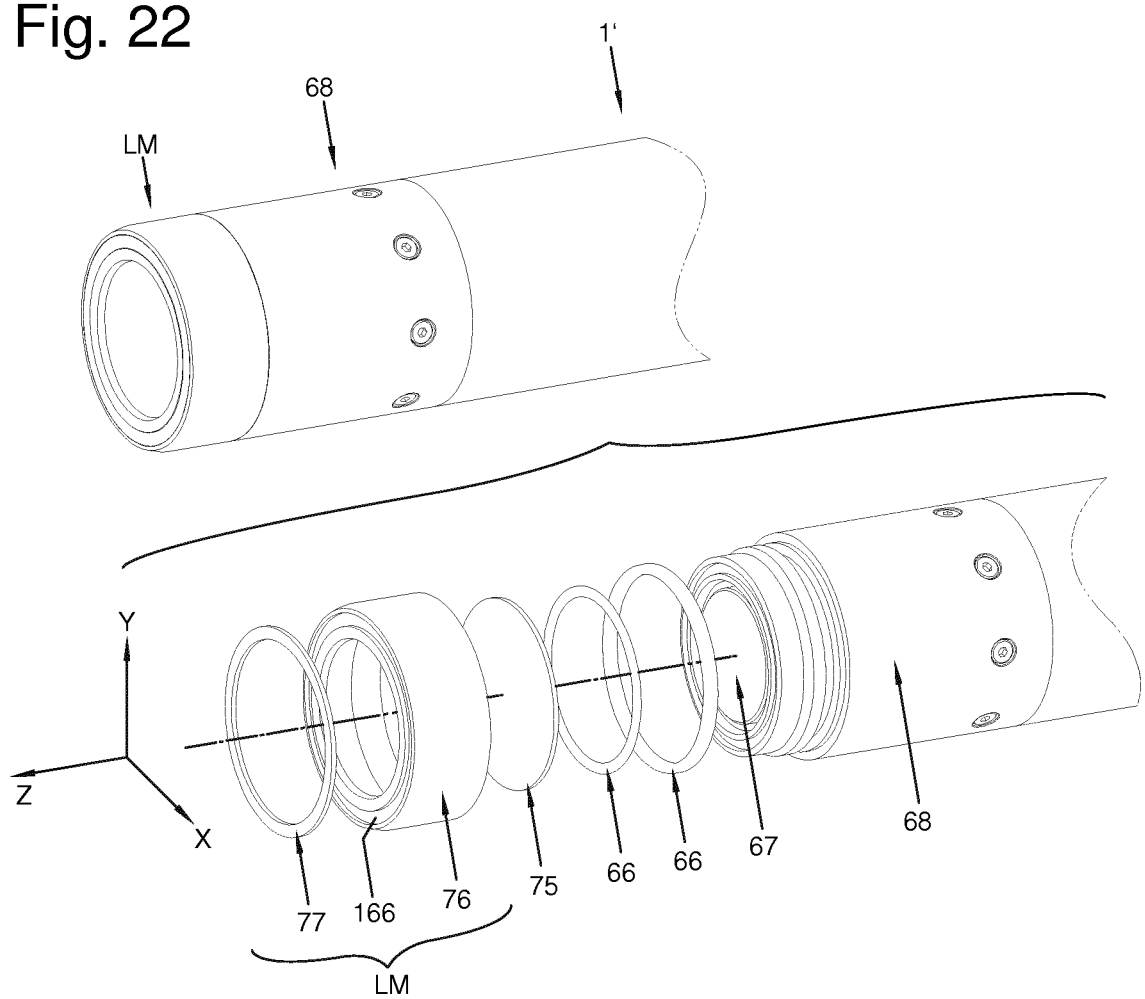
FIG. 22 an exploded illustration of the structure of an illumination module.

The exploded illustration according to FIG. 22 illustrates that it is also conceivable to arrange in the region facing the object to be observed of the external housing-type envelope geometry a functional unit LM surrounding at least partially the lens for illumination at a corresponding substantially conforming counter surface 166 of a carrier unit 76 in such a way that, on the one hand, a whole system that is at least protected against external influences is achieved and, on the other hand, at least by means of a provided connection (not illustrated) with the system electronics SE (FIG. 1) the intensity and color as well as the type of illumination of at least one illumination element 77 is adjustable and an optimal illumination of the object to be recorded is achieved so that in addition (partially complex) illumination systems can be replaced. Moreover, in this way an illumination of application environments can be achieved in which current illumination systems—for example, for space reasons—cannot be used.

For information processing and/or information transmission (e.g. according to FIG. 1), the concept according to the invention provides at least one corresponding system electronics SE which can be substantially embodied as a functional unit controlling the internal and external system components, wherein in particular at least control units AI, AF, AZ, and AL for respective control of an actuating member of the image brightness, of the image sharpness, of the image detail, and of an illumination module are provided and, in addition, at least one control program integrated into the system is activatable.

In this context, it is also provided that, after mounting a substantially arbitrary lens, an automated initialization or query and recognition of the mechanical and electronic parameters is performed. In this context, in addition to a manual input of the adjusting range, in particular at least an automatic determination of the end stops limiting the range of movement of the respective aperture drive is provided such that the actuating unit of the lens for opening the aperture is automatically moved by a correspondingly correlated functional unit until the adjusting range is detected by the synchronously recorded positions of the mechanical end stops. For ensuring a reliable and precise determination of the adjusting range, it is also conceivable when determining the end stops to additionally take into account the at least sensor-based measured brightness value, for example, from the image recording unit 15 or 15', in such a way that in the simplest case end stops can be determined by the minimum (first occurring adjusting position without impinging light or sensor measurement) and the maximum (first occurring adjusting position with maximum brightness) of the brightness value. An exact correlation of f-stop or mechanical adjusting position for aperture can thus be precisely computed or interpolated by use of the respective known aperture range. In addition to an advantageous manual adjustment of an exact aperture value, in combination with an automatic control of the electronic image parameters, a precise automatic control of substantially arbitrary lenses in general and at least of the aperture in particular can be achieved. In analogy, this method is provided for all further actuating members of a mounted lens.

It is provided that, on the one hand, the central system electronics SE can be constructed of a plurality of individual functional units that can be arranged arbitrarily in the entire system region independent of the modular boundaries illustrated in FIG. 1 and, on the other hand, the unit SR for at least rotatory connection of the central control unit SE with at least one interface module can also be arranged arbitrarily in the entire system region independent of the illustrated modular boundaries.

It is in particular conceivable that in this way an intelligent communication with further systems can be achieved. Taking into consideration the afore described advantageously adjustable and scalable mechanical and systematic embodiment of the whole system, it is possible—for example, by a synchronization with at least one further (camera) system—to achieve a multi-camera system in such a way that, for example, a functional unit can be achieved which is embodied of two whole system positioned relative to each other at an at least continuously adjustable distance and which is capable of making intelligent three-dimensional recordings which correspond very precisely to the real perception. As a result of the system-inherent flexible scaling, by means of an at least geometric enlargement as well as reduction of the whole system the minimally and maximally achievable distance of the individual synchronized (camera) systems can be reduced or enlarged likewise.

In addition, an additional storage part IFD arranged at least in the region of the central functional unit and/or a storage part EFD which can be exchangeable, as needed, for recording and future evaluation of recordings can be utilized. In this way, it is achieved that the whole system can be integrated seamlessly into existing systems as well as can be expanded and controlled with substantially arbitrary devices. Also, it is provided that, for example, by means of sensor-based output control signals ASX, ASY for additional actors acting on the X axis and Y axis, corresponding actuating members can be connected and activated in such a way that a complete orientation correction of the image sensor and of the whole system in the three-dimensional space can be achieved.

It is understood that components of a power supply, not illustrated in detail, can be provided for the control of the system. In particular, the use of batteries or rechargeable batteries is provided. Likewise, it is conceivable that the whole system can be connected or is connected to an external power supply.

Alternative Embodiments

In addition to the afore described actuating members, alternative functional units for the drive or the control of the at least moveably supported component groups are conceivable whose configuration can be embodied as a system module which at least partially surrounds the component group to be driven and is substantially arbitrarily arranged on the Z axis or optical axis. In addition to an (electro) magnetically embodied movement, in particular the advantageous utilization of the so-called piezoelectric principle of action is conceivable in this context.

Figure 23:
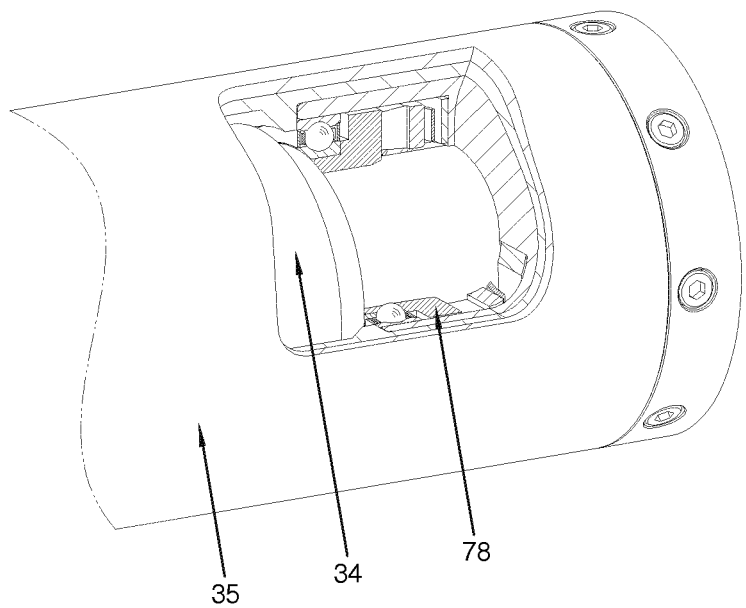
FIG. 23 an isometric partially sectioned illustration of an alternative embodiment of the whole system with a conceivable alternative adjusting unit.
Figure 24:
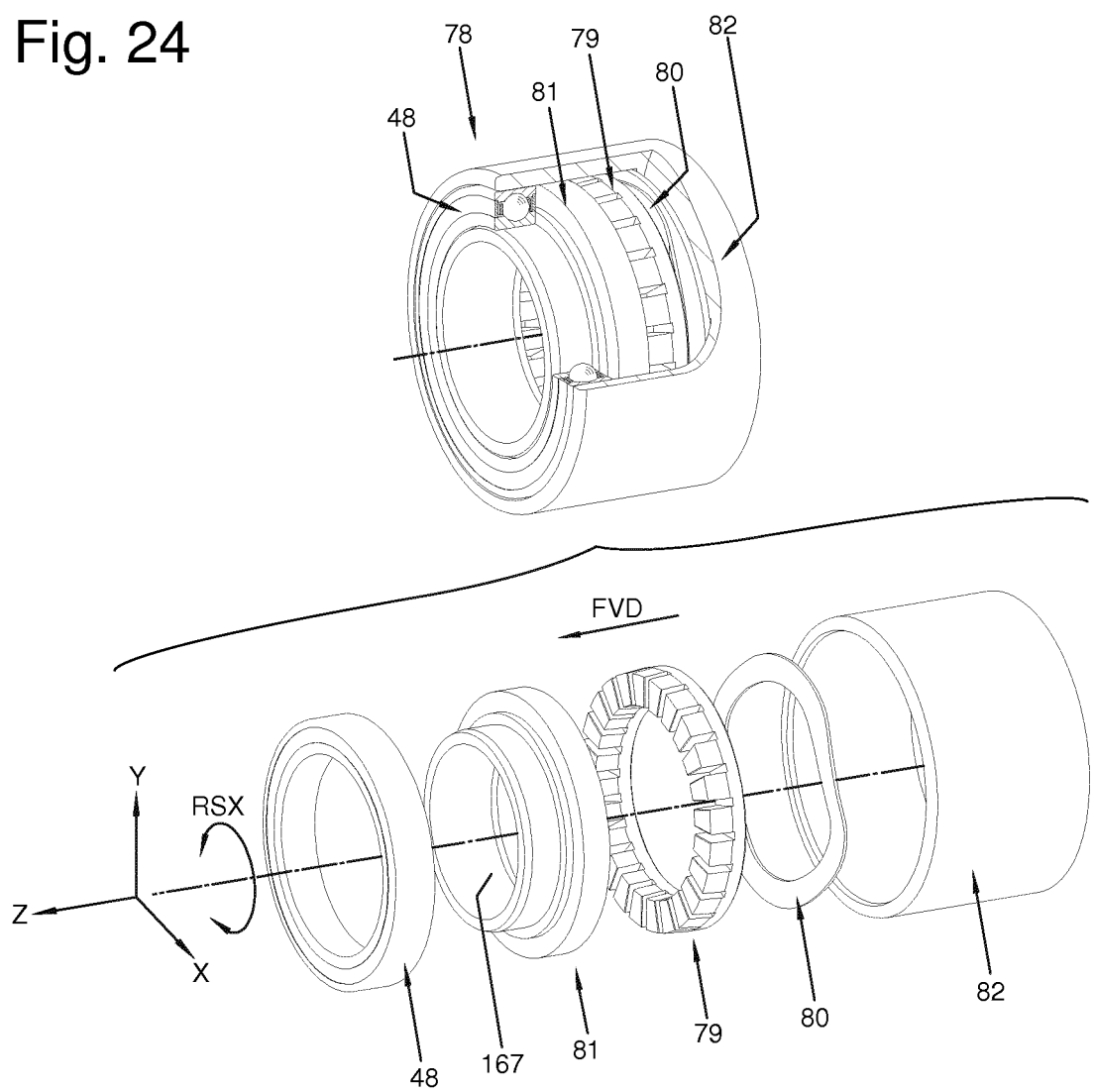
FIG. 24 an isometric partially sectioned illustration of the alternative adjusting unit according to FIG. 23.

While the detail illustration of the perspective view of the whole system 1' according to FIG. 23 discloses a possible alternative actuating unit 78, FIG. 24 illustrates a conceivable detailed configuration thereof based on an intelligently synchronized excitation of the piezoelectric actor elements that can be integrated into the functional unit 79 in order to generate a wave form which is moving about the circumference and which, by means of the pretension FVD exerted by the spring element 80, transmits a rotation movement RSX to the rotor element 81 that, by means of a bearing element 48b, is movably supported against an external geometry 82 and, by means of a correspondingly embodied functional surface 167, can be connected to the central functional unit 34. In this way, an optimal power density with minimal spatial requirement and, at the same time, an exactly controllable and service-free adjusting movement can be achieved.

For further optimization of the mechanical structure, it is also conceivable that the pretension as well as the inducing spring element identified beforehand by 49 or 18 can be replaced by the functional structure illustrated in FIG. 23 or FIG. 24 in such a way that by means of the pretension FVD, which is imparted for transmitting the rotational movement RSX, a likewise play-free whole system can be achieved simultaneously with a significant reduction of the mechanical complexity.

Figure 25:
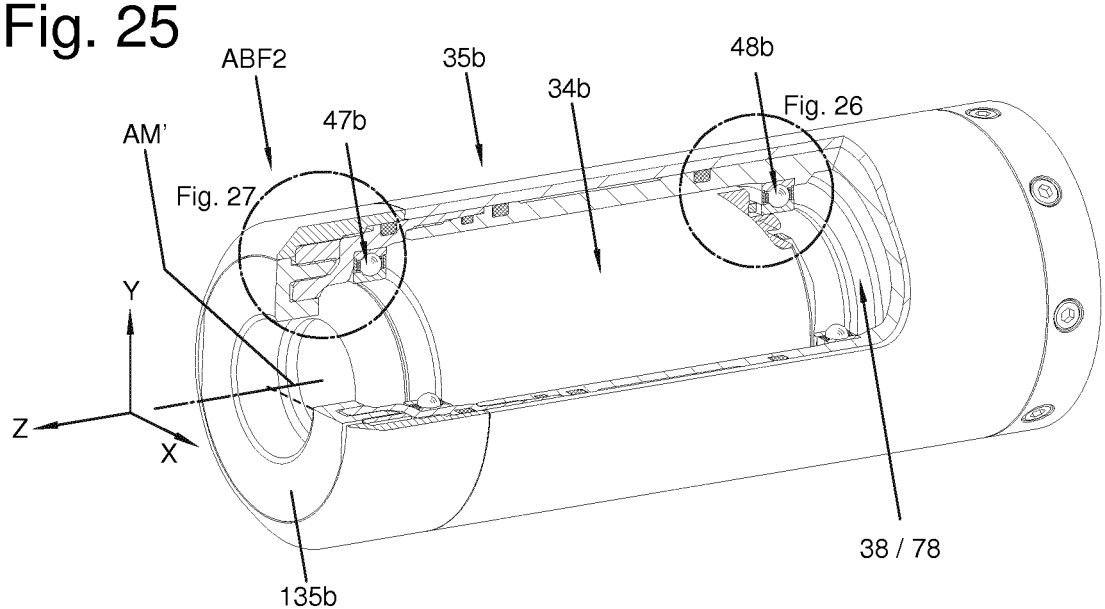
FIG. 25 an isometric partially sectioned illustration of an alternative support, pretension, and functional unit for adjusting the flange focal distance in the operating state.

In view of a possible different realization of the external structure module 35b, the alternative embodiment of a functional unit ABF2 for adjusting the distance of the lens mounting surface 135b to the imaging surface 107' of the image recording unit 15' (or for adjusting the flange focal distance) as well as a possible further mechanical pretension configuration is illustrated in a perspective illustration according to FIG. 25.

Figure 26:
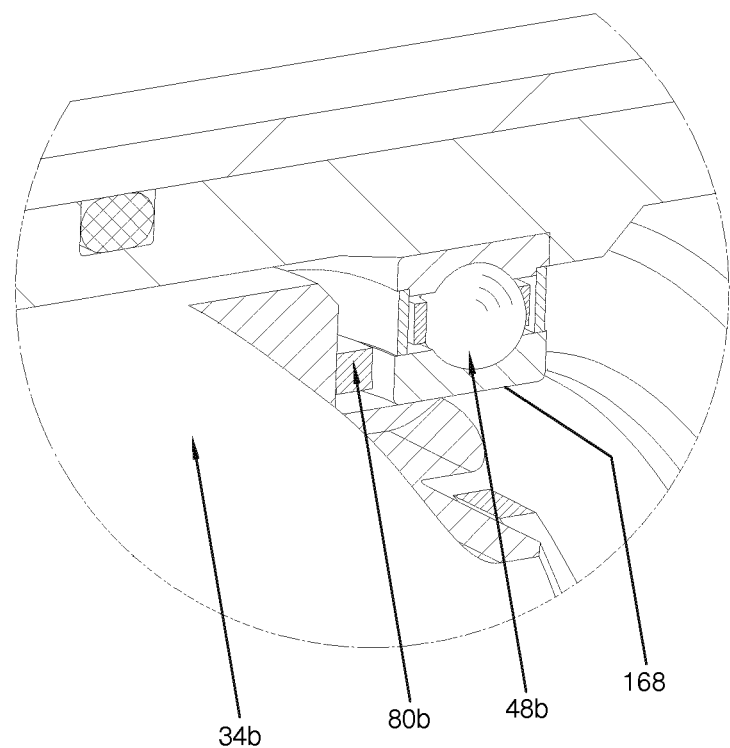
FIG. 26 an isometric partially sectioned detail illustration of an alternative pretension according to FIG. 25.

With reference to the perspective illustration according to FIG. 25 and the detail view shown in FIG. 26 of a further conceivable configuration of a bearing region, the component group 34b can be embodied as a rigid central functional unit which is generally guided advantageously on a corresponding functional surface 168 and pretensioned by a spring element 80b between at least two bearing elements 47b or 48b and accommodates at least one observation system as well as system electronics.

Figure 27:
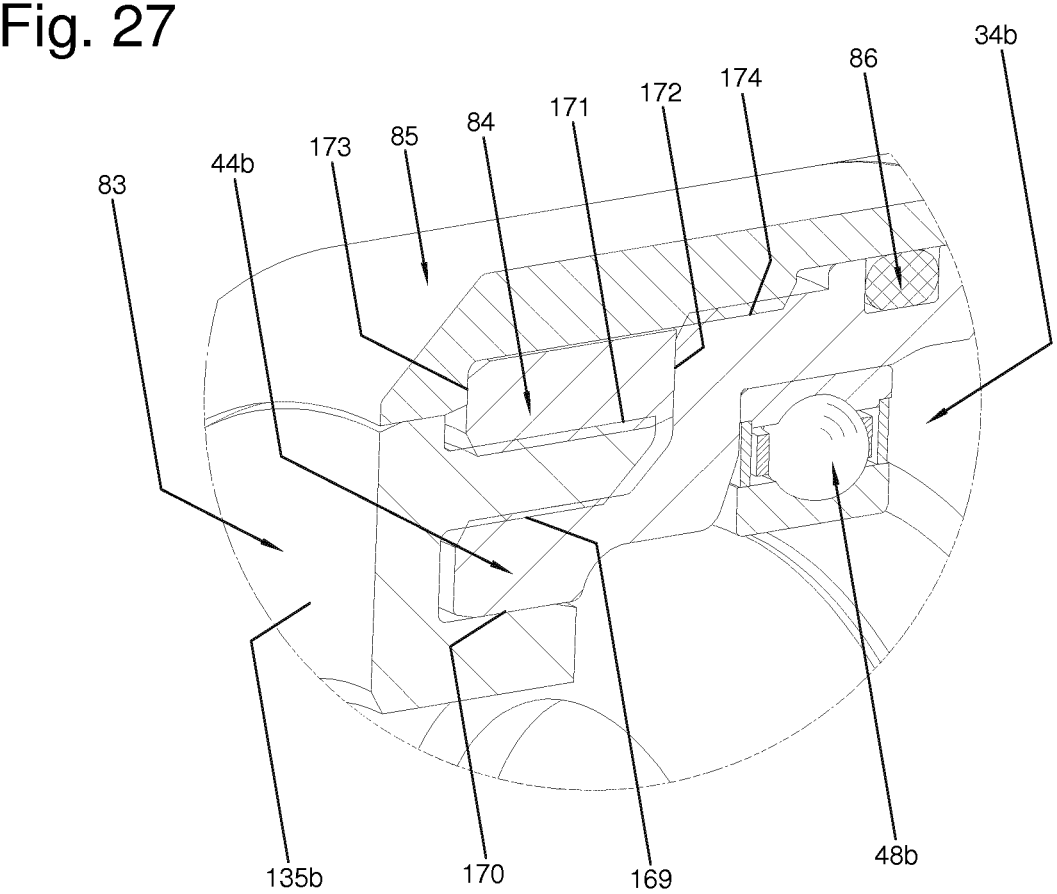
FIG. 27 an isometric partially sectioned detail illustration of an alternative functional unit for adjusting the flange focal distance according to FIG. 25.

A lens mounting unit 83 according to the detail view of FIG. 27 can be connected for this purpose by a connecting surface 169 with an at least partially housing-type surrounding structure 44b with form fit and/or friction fit and axially adjusted, wherein the flange focal distance AM' (FIG. 25) can be precisely adjusted by means of a functional surface 170 embodied as a centering action and guide.

For protection against accidental displacement of the imaging surface 107', it is provided to clamp an actuator 84 that at least partially surrounds the lens mounting surface 83 by means of a friction-fit and/or form-fit connection 171 against a correspondingly embodied pressure surface 172 of the external structure 44b. An additional securing action of the functional unit ABF2 for adjusting the flange focal distance against accidental displacement or damage can be achieved by an envelope element 85, which at least partially surrounds the actuator 84 and acts against at least one contact surface 173 and which can be connected by a correspondingly embodied action surface 174 by friction fit and/or form fit and by means of at least one sealing element 86 so as to be secured against external influences and media. It is understood that in addition to the illustrated screw connection also alternative embodiments are conceivable here.

Figure 28:
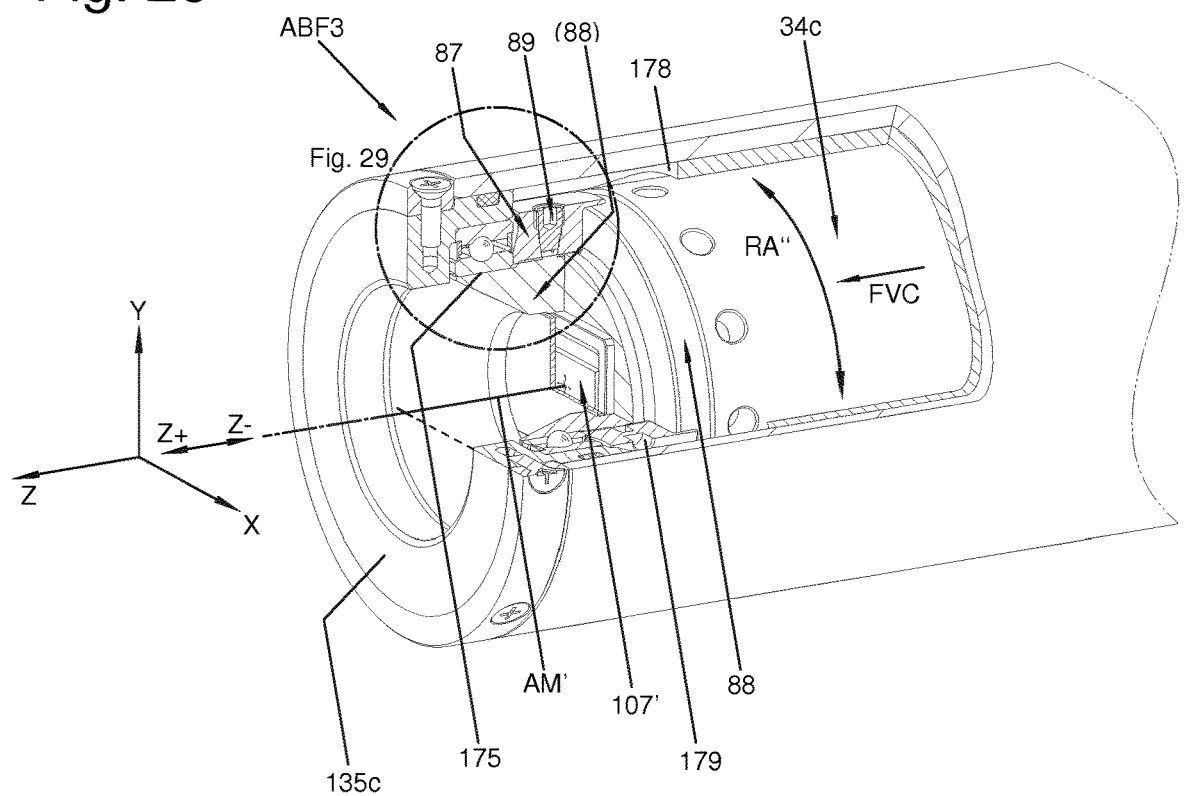
FIG. 28 an isometric partially sectioned illustration of an alternative functional unit for adjusting the flange focal distance in the operating state.
Figure 29:
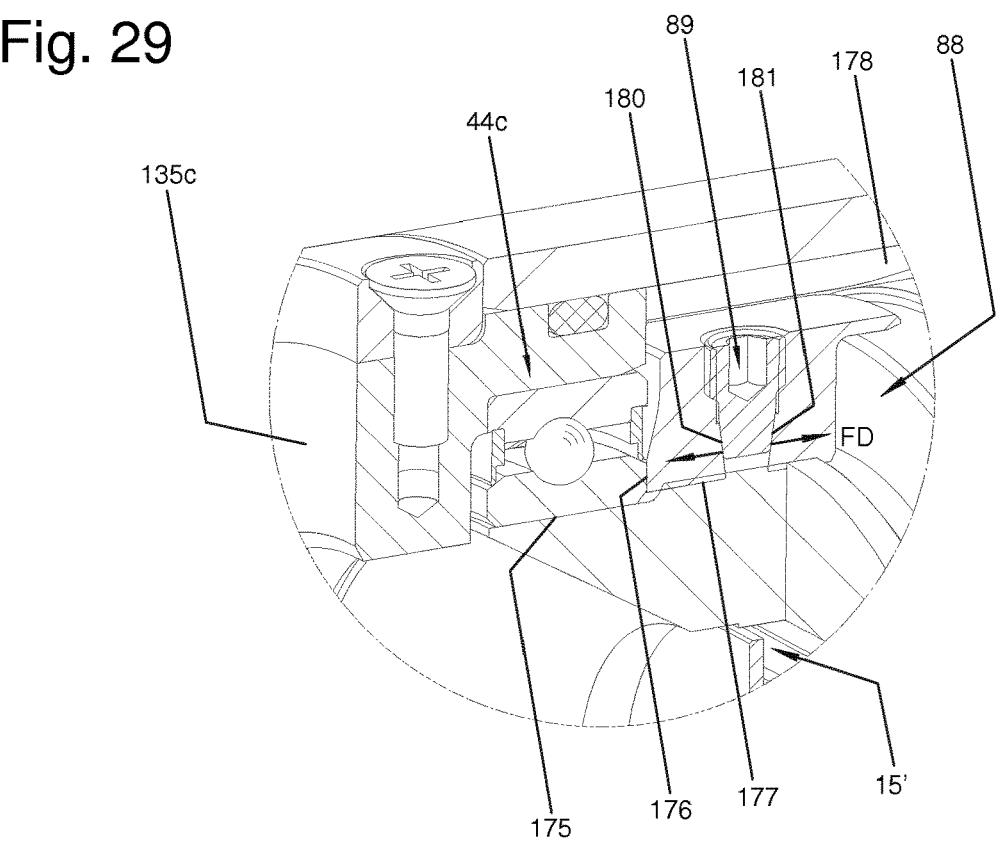
FIG. 29 an isometric partially sectioned detail illustration of the alternative functional unit for adjusting the flange focal distance according to FIG. 28.

The embodiment of a further alternative functional unit ABF3 for adjusting the distance of the lens mounting surface 135c relative to the imaging surface 107' (or for adjusting the flange focal distance) is illustrated in the perspective illustration according to FIG. 28 and in an enlarged detail view according to FIG. 29. By the configuration of a guiding surface 175 at least in the region of the image recording unit 15' and of the actuator 87, on the one hand, an advantageous centering action and guiding action of the base plate 88, which accommodates the image recording unit 15, is supported without play, and interacts with the central functional unit 34c that is provided at least with the observation system, can be achieved in this context. In addition to a minimal space requirement, on the other hand, a precise adjustment of the flange focal distance AM' by means of the actuator 87 is possible in such a way that, under the action of the introduced pretension FVC, a displacement of the pressure surface 176 induced in Z direction or along the optical axis results in a distance change of the imaging surface 107' relative to the lens mounting surface 135c. In this context, it is provided that the embodiment of the actuator 87 enables at least an adjustable friction-fit and/or form-fit connection 177—for example, in the form of a thread connection—in the region of the base plate 88 so that a transformation of a rotation of the actuator 87 in the direction RA", introduced by the user, can achieve a translation of the pressure surface 176 in the Z direction or along the optical axis relative to the lens mounting surface 135c.

Based on an arrangement of the functional unit ABF3 for adjusting the flange focal distance in the from at least partially surrounding structure 44c for additional protection against external influences, blockages or undesirable displacement, a rotation of the actuator 87 by means of corresponding operating tools (not illustrated) can be enabled for this purpose by means of functional surfaces 179 accessible through a corresponding opening 178.

For a safe fixation and the protection of the adjusted position of the actuator 87, at least a correspondingly embodied clamping element 89 is provided that, for example, by means of a friction-fit and/or form-fit connection, can be driven into the actuator 87 in such a way that with the thus resulting forces, acting on correspondingly embodied contact surfaces 180 or 181 and generally identified at FD, a controllable blockage of the friction-fit and/or form-fit connection between base plate 88 and actuator 87 is achieved. The configuration is advantageously embodied in this context such that, on the one hand, a self-locking action of the clamping element 89 enhancing the securing action is achieved and, on the other hand, no plastic deformation impairing the function occurs in the connecting region of the actuating member.

Figure 30:
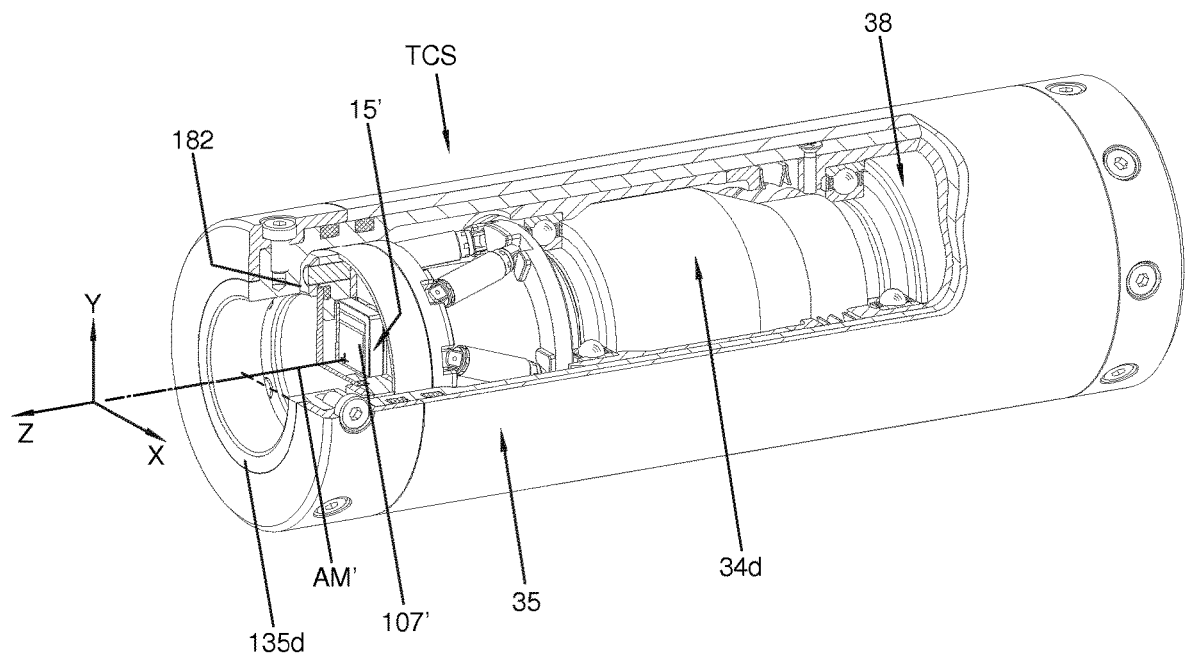
FIG. 30 an isometric partially sectioned illustration of an adapted functional unit for correction of high-frequency tilting and vibrations in the operating state.

The system structure illustrated in FIG. 30 illustrates an alternative configuration of the central functional unit 34*b* installed in operating position which replaces the functional units for adjustment of the flange focal distance AM' as well as of the compensation of vibrations and tilting of the image recording unit 15' relative to the lens mounting surface 135*d* and combines them to a functional unit TCS.

Figure 31:
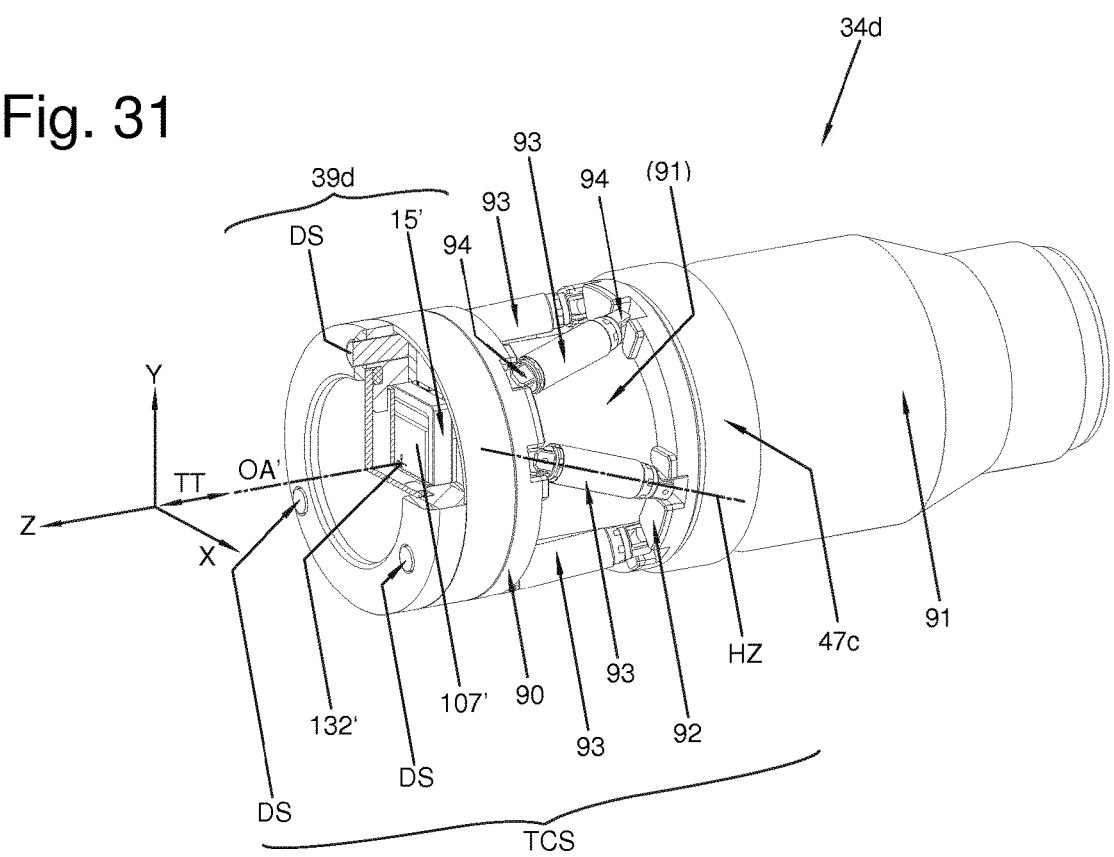
FIG. 31 an isometric detail illustration of the adjusted functional unit for correction of tilting and vibrations of FIG. 30.

In the perspective illustration of the central functional unit 34*d* according to FIG. 31, a construction is illustrated which is based on a parallel kinematic mechanical structure whereby in particular a highly precise three-dimensional rotation of the image recording unit 15' about the center 132' of the imaging surface 107' as well as a translation TT relative to the lens mounting surface 135*d* (FIG. 30) is enabled. A functional unit for substantially arbitrary manipulation of the spatial orientation of the image recording unit 15' can be achieved with at least one head component group 39*d* comprising the imaging surface 107' in the region of the base 90 and a mechanical support 92, rigidly interacting with the housing-type base structure 91 of the central functional unit 34*d*, engaging and supported advantageously by means of a bearing element 47*c*, in the form of actuating elements 93 that, at least by axial length change, act on respective movement axes HZ.

The actuators 93 are arranged and supported relative to each other such that the described three-dimensional movement of the head component group 39*b* the relative differences, monitored by sensors DS, of the distances to the reference plane 182 (FIG. 30) relative to each other are minimized or in an exactly corrected state are equal to zero and, in this way, highly frequent tilting can be reliably compensated. In this context, it is understood that an advantageous integration of the central functional unit 34*d* into the total system is conceivable by means of the embodiment illustrated in FIG. 30 as well as by the afore described realizations.

The exact adjustment of the flange focal distance AM' (FIG. 30) is realized herein by means of a translation TT of the imaging surface 107' resulting from a substantially uniform and advantageously synchronized activation of the actuators 93. In advantageous embodiment, it is conceivable also in this context that, for reaching an optimal positioning precision as well as control speed, corresponding actors—for example, on the basis of utilization of the piezoelectric effect—can be employed. By means of the positioning of the actuators 93 surrounding at least the base structure 91 illustrated in FIG. 31 an optimal utilization of the installation space can be achieved moreover. Also, it is conceivable that the connection—for example, at least by means of gimbal joints 94 according to FIG. 31—of the respective actuators 93 in the region of the base 90 or the mechanical support 92 can also be embodied advantageously in play-free configuration by flexure joints.

Figure 32:
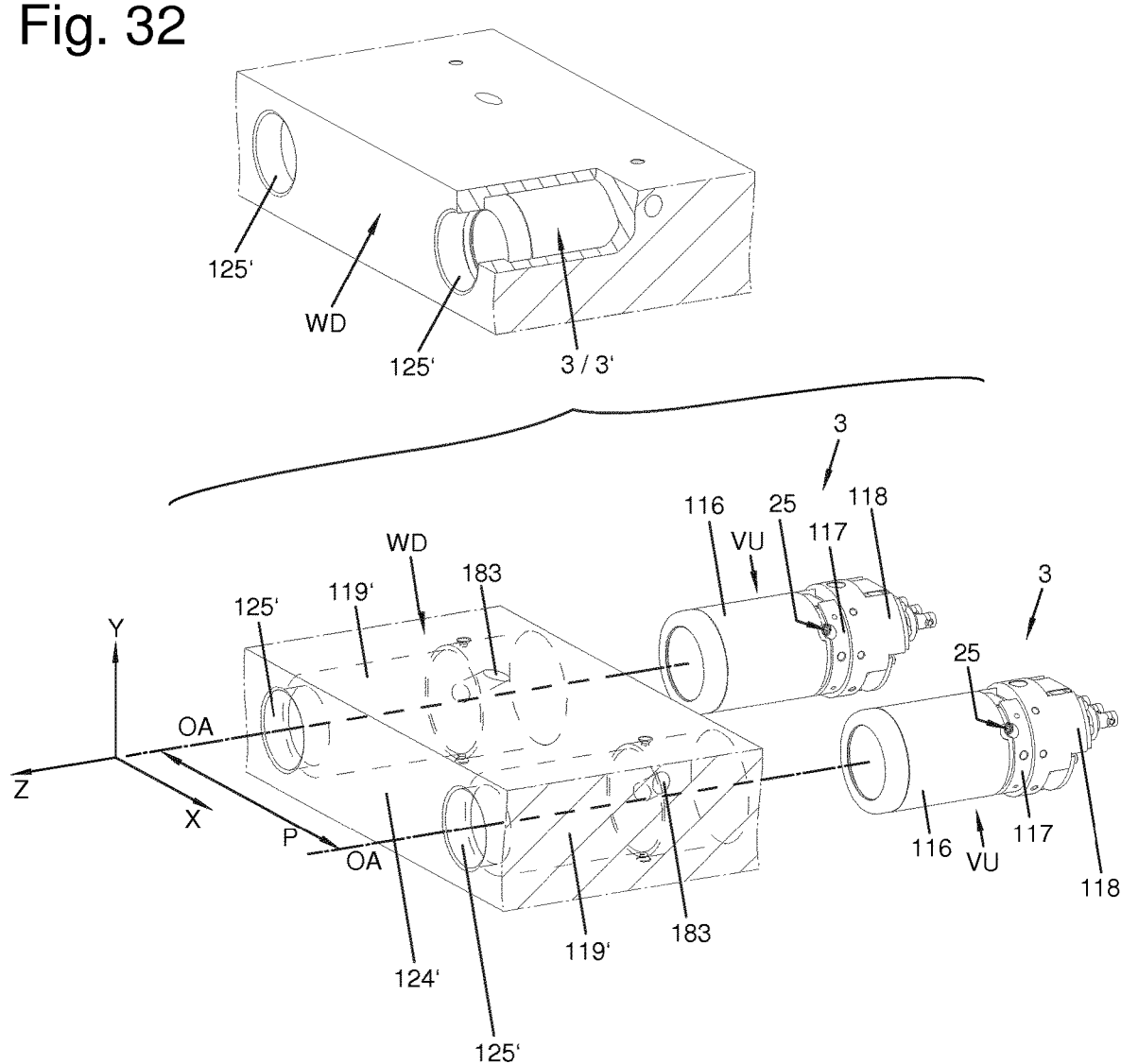
FIG. 32 an isometric illustration of a conceivable installation in a substantially arbitrary geometry based on the example of a thin-wall structure.

Even though the external system geometry in general has been illustrated and described above as a cylindrical shape, it is understood that likewise other substantially freely selectable external geometries are conceivable. An adaptation to arbitrary structures can be enabled in this way and the whole system can be achieved for installation in further functional units, modules or systems, as shown is in exemplary fashion in FIG. 32 with the example of the installation of a conceivable realization of the first embodiment in an at least thin-walled substantially arbitrary holding geometry WD.

For this purpose, it is provided that the holding geometry WD, in analogy to the combination with an interface element 31 according to FIG. 10, is prepared with an inner contact surface, which is embodied to surround substantially conformingly the external guiding surfaces and mounting surfaces 116 to 118 and which, at least in general, corresponds to an advantageous simple geometry 119', in such a way that a precisely aligned and centered mounting is enabled as well as the mechanical guiding action and adjustment of the observation unit VU on the respective optical axis AO is enabled. According to the invention, it is conceivable in this context for realization of the desired adjusting movement to control the functional unit ABF for adjustment of the flange focal distance via a substantially arbitrarily designed access 183 as well as to perform, without access, by means of an integral drive in the drive element 27. Imaging systems—for example, a lens—can be reliably arranged at a correspondingly embodied mounting surface 124'—for example, an external wall geometry—in the region of an eye 125'. As a result of the system-inherent scaling of the functional unit in accordance with the invention, it is thus possible, while ensuring maximum flexibility and modularity, to integrate in this context substantially arbitrary combinations of functional units with a high packing density P protected against external influences.

In addition to the movement generation on the basis of an (electro)magnetic or piezoelectric principle, further actors—for example, fluid-driven or compressed air-driven and conventional (wave) or gear-based (step) motors—are conceivable as well as an expansion of substantially arbitrary functional units for movement generation with corresponding electronic and/or mechanical functional units (e.g., encoders) for exact reproduction of adjusting movements and/or for the safe movement into discrete (stored) positions and orientations. In addition, it is conceivable that by means of reference sensors—for example, by means of additional sensor XS (FIG. 1) in addition to the orientation sensor OS—the control precision of the respective correlated actor system can be improved.

It is understood that, for configuration of a pretensioned mechanical system, in addition to the described embodiments, alternative spring elements such as, for example, spiral springs, wave springs, plate springs, flexure springs or pretension-inducing functional units that are water-, air-, and oil pressure-activated or the like—as well as support elements—for example, rolling bearings, magnetic bearings, flexure bearings or similar bearings—are conceivable.

Moreover, it is in particular conceivable to respectively embody the (rotatory) signals lines, of the whole system to the exterior and as an alternative to the described internal transmission by means of the described component SR (FIG. 1), in a contactless, optical, magnetical or radio-based way—for example, by means of a corresponding (signal line) functional unit WI.

It is also understood that a system structure that is completely protected against external influences and media can be achieved elastomer-based or polymer-based as well as by metallic sealing surfaces. Corresponding sealing elements can be embodied in this context also in a multi-part configuration. Moreover, e.g., for weight reduction, it is conceivable that the whole system, at least in sections thereof, is embodied without sealing elements and the mechanical structure for this purpose is provided as a rigid unit which surrounds at least partially the inwardly positioned modules and functional elements. In particular, in this context the external structure, for example, can make accessible the control members of a connected lens by correspondingly designed openings and, in this way, enable a manual operation thereof as well as ensure protection of the surrounding functional elements and modules from external influences and accidental displacement.

Patent claims follow wherein reference characters of elements which have been illustrated in this application with different embodiments are separated from each other by a semicolon. This serves only for ease of understanding and does not constitute a limitation.

What is claimed is:

1. A system structure for image recording, image stabilization, and image correction, comprising:
   an optical observation device that is to be arranged in a region of a housing concept and that comprises an observation system, wherein the observation system comprises an image recording unit comprising an imaging surface, wherein the image recording unit is movable in a movement direction along an optical axis and is supported without play in the movement direction by a first spring-induced mechanical pretension;
   at least one functional unit for adjusting a flange focal distance, wherein the at least one functional unit for adjusting a flange focal distance interacts with the observation system such that a continuous adjustability of the flange focal distance is achievable by an axial movement of the image recording unit along the optical axis;
   at least one adaptable interface element for mounting an imaging device, wherein the at least one adaptable interface element surrounds the observation system at least partially and supports the observation system in a guided fashion, wherein the at least one adaptable interface element comprises an inner geometry, wherein the inner geometry is embodied in accordance with external guiding and mounting surfaces of the observation system in a coaxial orientation at least in the same direction and centered in relation to the external guiding and mounting surfaces of the observation system, and wherein the observation system and the at least one adaptable interface element form a system with a full functional range of the observation device.

2. The system structure according to claim 1, wherein the image recording unit is rotatable about the optical axis and is supported without play regarding rotation about the optical axis by a second spring-induced mechanical pretension, wherein the observation system interacts with an actuating member or an actuating unit such that the image recording unit, in an arbitrary position of the system structure, can be aligned relative to a respective recording position by rotation about the optical axis, wherein a pivot angle of more than ±360° can be compensated by the actuating member or the actuating unit.

3. The system structure according to claim 2, wherein a spring element inducing the second spring-induced mechanical pretension supporting the image recording unit without play regarding rotation is configured to extend fully circumferentially in a circumferential direction about the optical axis.

4. The system structure according to claim 2, comprising a single spring element inducing the first spring-induced mechanical pretension and the second spring-induced mechanical pretension.

5. The system structure according to claim 1, wherein the at least one functional unit for adjusting the flange focal distance comprises functional surfaces embodied such that an accidental displacement of the flange focal distance is prevented.

6. The system structure according to claim 1, wherein the observation system comprises a mechanical base and further comprises an observation unit accommodating the image recording unit, wherein the observation unit is movable relative to the mechanical base along the optical axis and is supported without play in the movement direction by the first spring-induced mechanical pretension.

7. The system structure according to claim 6, wherein a freedom of movement of the observation unit is limited to a translation parallel to the optical axis by a spatial parallel displacement of a movement axis of an actuating member of the at least one functional unit for adjusting the flange focal distance.

8. The system structure according to claim 1, wherein the at least one functional unit for adjusting the flange focal distance is integrated in the observation system and is at least partially fixed relative to a mechanical base of the observation system.

9. The system structure according to claim 1, wherein an adjusting movement introduced by a user is transformed into a translatory displacement of the image recording unit along the optical axis by the at least one functional unit for adjusting the flange focal distance and a calibration of the flange focal distance can thus be achieved.

10. A system structure for image recording, image stabilization, and image correction, comprising an optical observation device that is to be arranged in a region of a housing concept, the system structure forming a functional unit comprised of functional modules with an integrated observation system, wherein the functional modules are connected without play by a mechanical pretension in an operating state and are alignable relative to predeterminable recording positions, wherein an image recording unit is controllably supported in a central module of the functional unit and, in relation to a system-fixed lens mounting surface provided in a region of an external structural module of the functional unit, is at least axially adjustable such that, independent of the functional unit moved into an operating position, the image recording unit in a respective position can be aligned relative to a respective recording position, the system structure further comprising at least one adaptable interface element for mounting an imaging device, wherein the at least one adaptable interface element surrounds the observation system at least partially and supports the observation system in a guided fashion, wherein the at least one adaptable interface element comprises an inner geometry, wherein the inner geometry is embodied in accordance with external guiding and mounting surfaces of the observation system in a coaxial orientation at least in the same direction and centered in relation to the external guiding and mounting surfaces of the observation system, and wherein the observation system and the at least one adaptable interface element form a system with a full functional range of the observation device.

11. The system structure according to claim 10, wherein the observation device by an actuating member or an actuating unit, arranged in a region of an inner module of the functional unit or of a central functional module of the functional unit, is adjustable in regard to a position relative to the horizon and in regard to respective recording parameters.

12. The system structure according to claim 10, further comprising at least one integrated sensor connectable to the actuating member or to the actuating unit and configured to align a position of the image recording unit, wherein the position of the image recording unit can be immediately operated or controlled by an output signal of the at least one sensor.

13. The system structure according to claim 10, wherein the observation system is interacting at least by a mechanical receptacle with an actuating member or with an actuating unit such that a module of the functional unit containing the image recording unit as a resulting functional module forms a part of the system structure that is pivotable at least about an optical axis of the observation system and is positionally independent of the lens mounting surface.

14. The system structure according to claim 10, wherein the observation system with the at least one adaptable interface element and with an external envelope structure forms the functional unit embodied as a complete observation system.

15. The system structure according to claim 10, wherein the image recording unit is contained in the observation system and is supported without play by at least one spring element against at least the lens mounting surface.

16. The system structure according to claim 10, wherein the functional unit comprises electronic components embodied as an at least singular folded system circuit board with flexible connections at least in sections thereof.

17. The system structure according to claim 10, wherein the central module supporting the image recording unit can be expanded with a functional module for correction of tilting relative to an optical axis of the observation system.

18. The system structure according to claim 10, wherein the observation device is configured to be covered by a receiving, substantially conforming geometry such that a housing-shaped envelope structure enables attachment of a lens in a region of an eye correlated with the image recording unit.

19. The system structure according to claim 18, further comprising at least one illuminating functional module surrounding at least partially the lens and arranged at the housing-shaped envelope structure.

20. The system structure according to claim 10, further comprising a radio control integrated into the functional unit, wherein the radio control forms a sender-receiver system configured to operated the observation device and/or further functional modules.

21. The system structure according to claim 20, wherein a sending unit of the sender-receiver system comprises a connecting line to storage parts arranged in a region of a central functional module of the functional unit such that an information transmission can be performed even for an unlimited rotational movement of more than 360° of the image recording unit.

22. A system structure for image recording, image stabilization, and image correction, comprising:
an optical observation device that is to be arranged in a region of a housing concept and that comprises an observation system, wherein the observation system comprises a mechanical base and an observation unit accommodating an image recording unit comprising an imaging surface, wherein the image recording unit is configured to move in a movement direction along an optical axis and is supported without play in the movement direction by a spring with mechanical pretension;
at least one functional unit for adjusting a flange focal distance, wherein the at least one functional unit for adjusting a flange focal distance interacts with the observation system such that a continuous adjustability of the flange focal distance is achievable by an axial movement of the image recording unit along the optical axis;
wherein the at least one functional unit for adjusting a flange focal distance comprises a worm gear configured to be subjected to a rotary adjusting movement, wherein the worm gear is fixed in relation to the mechanical base;
wherein the at least one functional unit for adjusting a flange focal distance further comprises a moveable adjusting unit supported in the mechanical base, wherein the worm gear comprises a tooth geometry and wherein the adjusting unit comprises a counter tooth geometry interacting with the tooth geometry of the worm gear;
wherein the observation unit comprises a pressure plate, wherein the pressure plate is pretensioned by a spring element with a pretension force via the adjusting unit against a stop of the mechanical base;
wherein the adjusting unit is configured to transmit via a thread the rotary adjusting movement of the worm gear to the pressure plate of the observation unit to induce a translatory displacement of the imaging surface of the image recording unit along the optical axis;
wherein a movement axis of the thread is arranged at a spatial parallel displacement in relation to the optical axis.

* * * * *